United States Patent [19]
Kackman

[11] Patent Number: 5,809,013
[45] Date of Patent: Sep. 15, 1998

[54] MESSAGE PACKET MANAGEMENT IN A WIRELESS SECURITY SYSTEM

[75] Inventor: Gerald M. Kackman, St. Paul, Minn.

[73] Assignee: Interactive Technologies, Inc., North St. Paul, Minn.

[21] Appl. No.: 599,061

[22] Filed: Feb. 9, 1996

[51] Int. Cl.[6] ........................................................ H04L 1/08
[52] U.S. Cl. ........................ 370/253; 340/636; 370/37.02; 370/69.1
[58] Field of Search .................... 340/825.06, 825.07, 340/825.08, 636, 506, 512; 370/229, 232, 233, 234, 253, 468, 474; 371/20.1, 37.02, 37.12, 37.8, 69.1

[56] References Cited

U.S. PATENT DOCUMENTS

| | | | |
|---|---|---|---|
| 4,672,365 | 6/1987 | Gehman et al. | 340/539 |
| 4,737,770 | 4/1988 | Brunius et al. | 340/539 |
| 4,761,648 | 8/1988 | Ellis | 340/539 |
| 4,855,713 | 8/1989 | Brunius | 340/506 |
| 4,906,055 | 3/1990 | Horiuchi | 307/354 |
| 4,947,484 | 8/1990 | Twitty et al. | 371/37.1 |
| 4,951,029 | 8/1990 | Severson | 340/506 |
| 4,980,913 | 12/1990 | Skret | 370/402 |
| 5,302,902 | 4/1994 | Groehl | 324/434 |
| 5,331,318 | 7/1994 | Montgomery | 340/855.4 |
| 5,363,071 | 11/1994 | Schwent et al. | 333/111 |
| 5,410,536 | 4/1995 | Shah et al. | 370/13 |
| 5,506,572 | 4/1996 | Hills et al. | 340/636 |
| 5,512,890 | 4/1996 | Everson, Jr. et al. | 340/870.13 |
| 5,559,499 | 9/1996 | Haubner | 340/636 |
| 5,586,121 | 12/1996 | Moura et al. | 370/412 |
| 5,602,831 | 2/1997 | Gaskill | 370/252 |
| 5,625,622 | 4/1997 | Johri | 370/232 |
| 5,633,861 | 5/1997 | Hanson et al. | 370/232 |

OTHER PUBLICATIONS

DiGiacomo, G. Metal Migration (Ag. Cu. Pb) in Encapsulated Modules and Time–to–Fail Model as a Function of the Environment and Package Properties, IEEE/Proc. IRPS, pp. 27–33 (1982).

*Primary Examiner*—Benedict V. Safourek
*Attorney, Agent, or Firm*—Fish & Richardson P.C., P.A.

[57] ABSTRACT

Information in the form of redundant message packets is sent between a remote device and a host device, e.g., a wireless security system. In order to conserve energy, the frequency of trigger events in the remote device is determined, and the number of redundant message packets sent is based on the determined frequency.

25 Claims, 47 Drawing Sheets

Fig. 4A

| Fig. 4A-1 | Fig. 4A-2 |
|---|---|

Fig. 4B

| Fig. 4B-1 | Fig. 4B-2 |
|---|---|
| Fig. 4B-3 | Fig. 4B-4 |

Fig. 4C

| Fig. 4C-1 | Fig. 4C-2 |
|---|---|
| Fig. 4C-3 | Fig. 4C-4 |

Fig. 4D

| Fig. 4D-1 | Fig. 4D-2 |
|---|---|
| Fig. 4D-3 | Fig. 4D-4 |

| FIG. 6A | FIG. 6B |
|---|---|
| FIG. 6C | FIG. 6D |
| FIG. 6E | FIG. 6F |

| FIG. 7A | FIG. 7B |
|---|---|
| FIG. 7C | FIG. 7D |

| FIG. 8A | FIG. 8B |
|---|---|
| FIG. 8C | |

| FIG. 9A | FIG. 9B | FIG. 9C |
|---|---|---|
| FIG. 9D | FIG. 9E | FIG. 9F |
| FIG. 9G | FIG. 9H | FIG. 9I |
| FIG. 9J | FIG. 9K | |

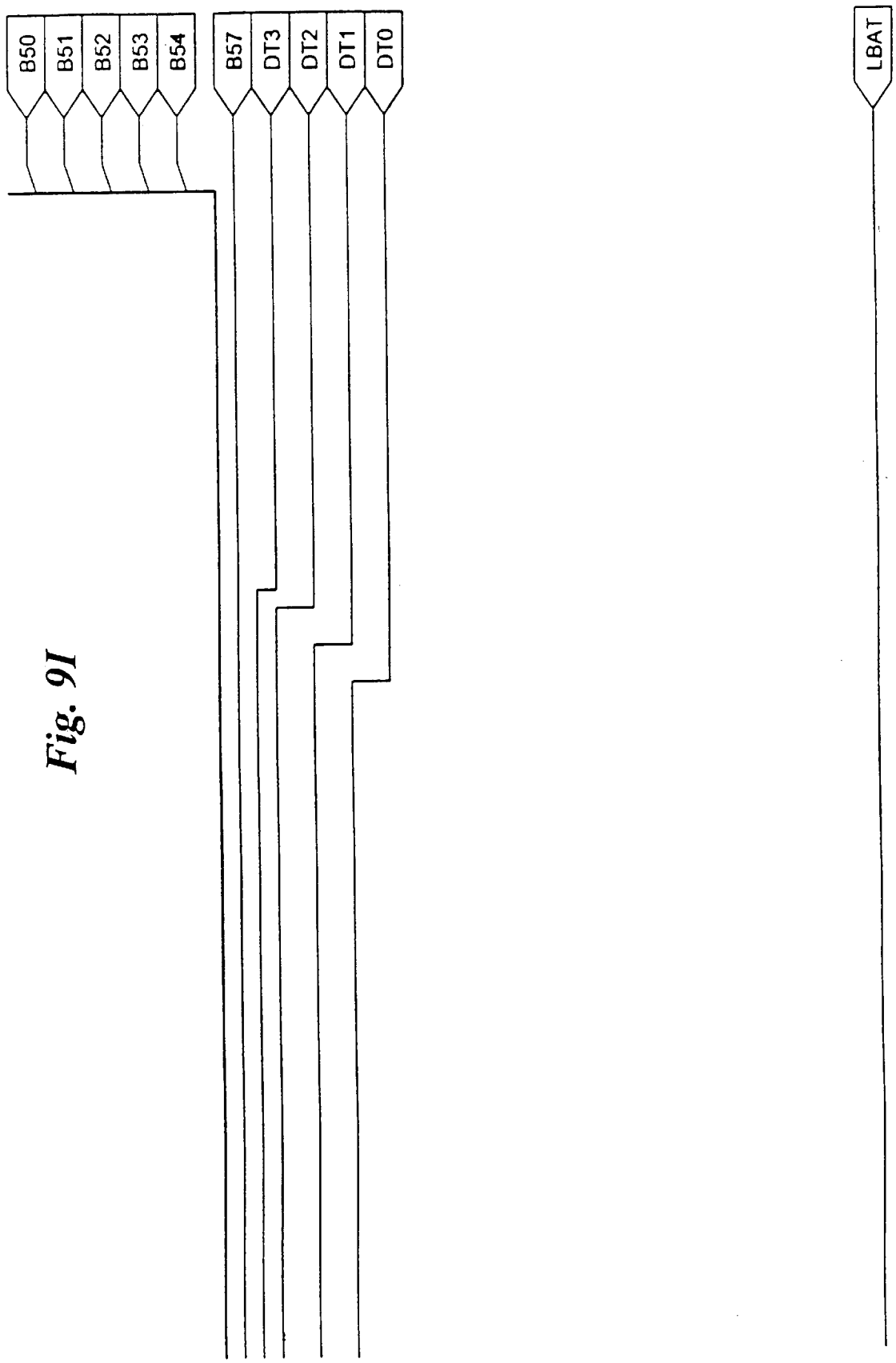

MESSAGE PACKET MANAGEMENT IN A WIRELESS SECURITY SYSTEM

BACKGROUND OF THE INVENTION

This invention relates to the management of message packets sent from a remote device to a host device, e.g., a wireless security system.

A message packet includes any discrete bundle of information that is transmitted in signal form. One application of a message packet transmission system is a security system 801 (FIG. 11) in which one or more transmitters 803 transmit message packets to a common system controller 805 by means of wireless communication. Each transmitter 803, which receives its information from a dedicated transducer, or "sensor," 809 (e.g., smoke detector, motion sensor, sound detector, leak detector), is typically powered by a battery, which must be replaced periodically.

The system controller 805 has a communication link to a central station 807, which in turn may contact, for example, the fire or police department or even another electronic device such as a computer (not shown).

When one of the sensors 809 is triggered by motion or other triggering event, its associated transmitter 803 transmits one or more message packets to the system controller 805, thereby signalling an alarm. Each message packet typically includes information about the nature of the alarm and the identity of the transmitter 803 and sensor 809 that generated the alarm. Depending on the information received, the system controller 805 instructs the central station 807 to take appropriate action in response, e.g., contacting the fire department.

One important consideration in any message packet transmission system is the reliability of the data link between the transmitters 803 and the system controller 805. Wireless transmission systems typically operate according to what is generally known as an "Aloha" protocol, i.e., transmitter 803 sends message packets but receives no feedback as to whether the message packets have been received by the system controller. Since any given message packet may indicate an alarm condition, it is extremely important to ensure that message packets are reliably transmitted to the system controller 805. Therefore, a series of redundant message packets are typically sent to system controller 805.

In wireless systems, transmitters 803 are typically battery-powered. Extending the battery life is an important design criteria. Therefore, minimizing the number of message packets sent to the system controller 805 is preferred. However, minimizing the number of message packets to extend the battery life is clearly at odds with the need for sending redundant message packets to ensure that at least one packet is received by system controller 805.

SUMMARY OF THE INVENTION

The present invention is directed to a method and apparatus for improving the reliability of the data link between a transmitter and associated system controller. A method is provided for sending information in the form of redundant message packets between a remote device and a host device where the frequency of triggering events in the remote device is determined and the number of redundant message packets is regulated based on the determined frequency of triggering events. The regulating may include selecting a quantity of redundant message packets that are sent for a given triggering event based on the determined frequency. The regulating may include reducing a quantity of redundant message packets if the determined frequency of trigger events exceeds a threshold time period. In one embodiment of the invention, the threshold period is about 4.25 minutes.

Additionally, an apparatus is provided for managing the transmission of message packets from a remote device to a host device, including a first component for measuring a frequency of successive input signals received from an external source, and a second component connected to the first component for varying the quantity of message packets sent from the remote device to the host device based on the frequency measured in the first component.

The present invention provides several advantages. The system controller should reliably receive at least one message packet from each transmitter since each transmitter sends multiple copies of the same message packet. At the same time, a transmitter may conserve its battery by minimizing the number of redundant message packets. This practice provides a sufficiently redundant data transmission while minimizing the number of necessary redundant transmissions. Thus, overall system performance is enhanced. Further, the need to frequently replace or recharge the transmitter's battery is avoided, thus lowering system maintenance cost and effort.

Other advantages and features will become apparent from the following description and claims.

DESCRIPTION OF THE EMBODIMENTS

Figure 11:
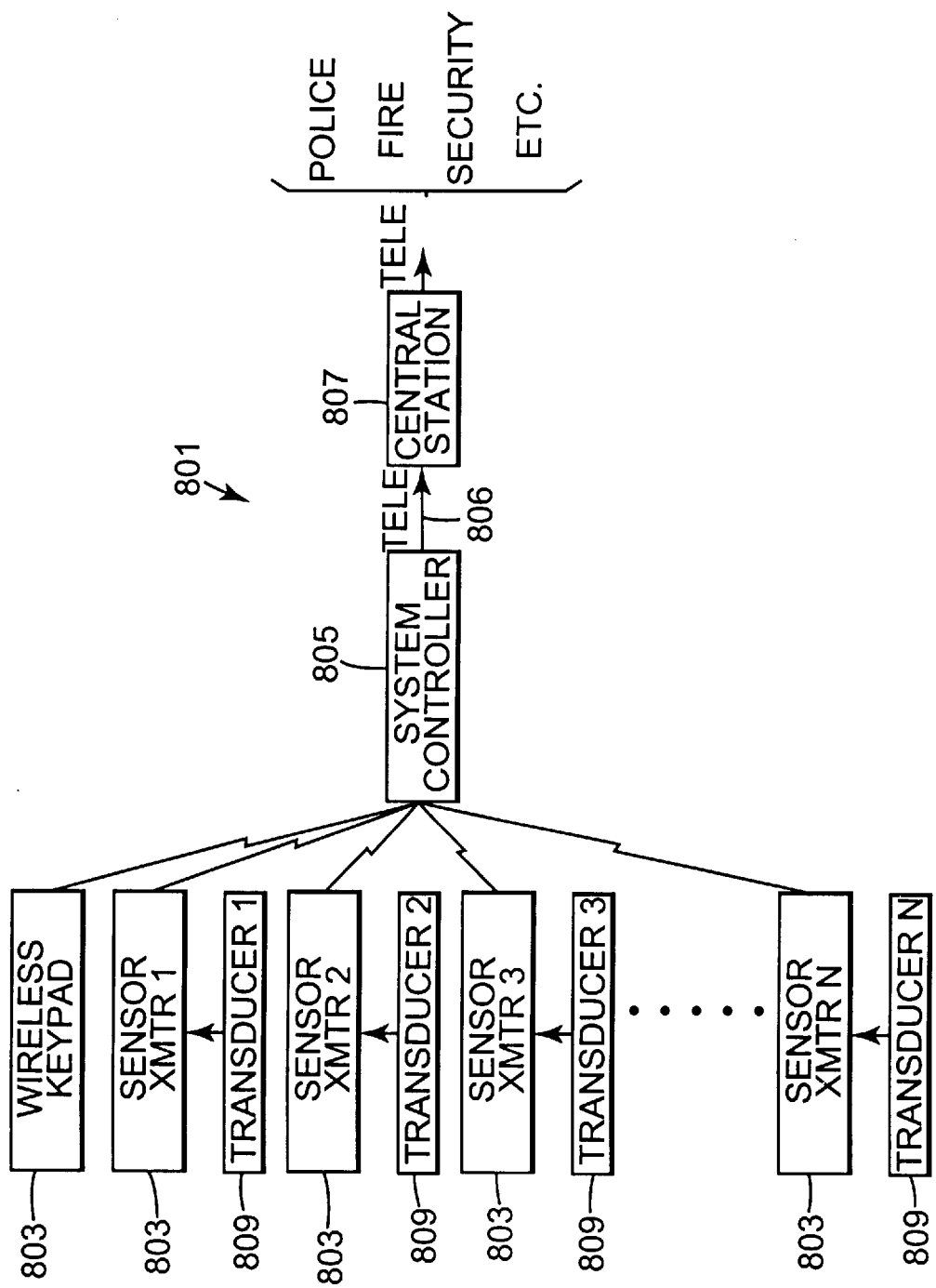
FIG. 11 is a block diagram of a message packet transmission system.

In the message packet transmission system shown in FIG. 11, each time a sensor 809 is triggered, its associated battery-powered transmitter 803 generates a message packet identifying the nature of the alarm and the identity of the transmitter, and sends the packet to the system controller. To ensure that this information is reliably conveyed, the transmitter generates and sends multiple copies of the same message packet, thus increasing the probability that the system controller will receive at least one complete message packet.

However, because each individual message packet transmission sequence expends a certain amount of energy, sending redundant message packets results in significantly greater energy usage than sending only a single message packet. Consequently, a frequently-triggered transmitter unit, if configured to send a relatively large number of redundant message packets for each sensor trigger, would quickly expend all of its available energy and would stop working until its battery was recharged or replaced. The desirability of sending redundant message packets must be balanced against the interest of conserving energy.

The relative need for redundancy may be inferred from frequency of triggering events and, consequently, frequency of transmissions. In a series of transmissions close in time, e.g., a minute between transmissions, one can infer a relatively low probability of harm if the most recent transmission is not received by the system controller for two reasons. First, one of the immediately previous transmissions was likely received. Second, a series of frequent transmissions likely indicates that an authorized person is active in the area covered by the sensor. The longer the time period between transmissions, the greater the probability of harm from an unsuccessful transmission.

Therefore, the present invention is directed to selecting the number of message packets transmitted for each triggering event based on the period since the last transmission (or transmissions). For each period, the number of packets transmitter is selected to balance the need for at least one packet to be successfully received with the need to minimize the number of packets to conserve the battery. Selecting the specific time periods and number of packets for each period can be based on testing or historical data collected for the particular system.

In one embodiment, for the period zero to one minute after a previous transmission, two packets are sent; for the period one to four minutes, four packets are sent; for the period four to eight minutes, six packets are sent; and for the period after eight minutes, eight packets are sent.

Figure 12:
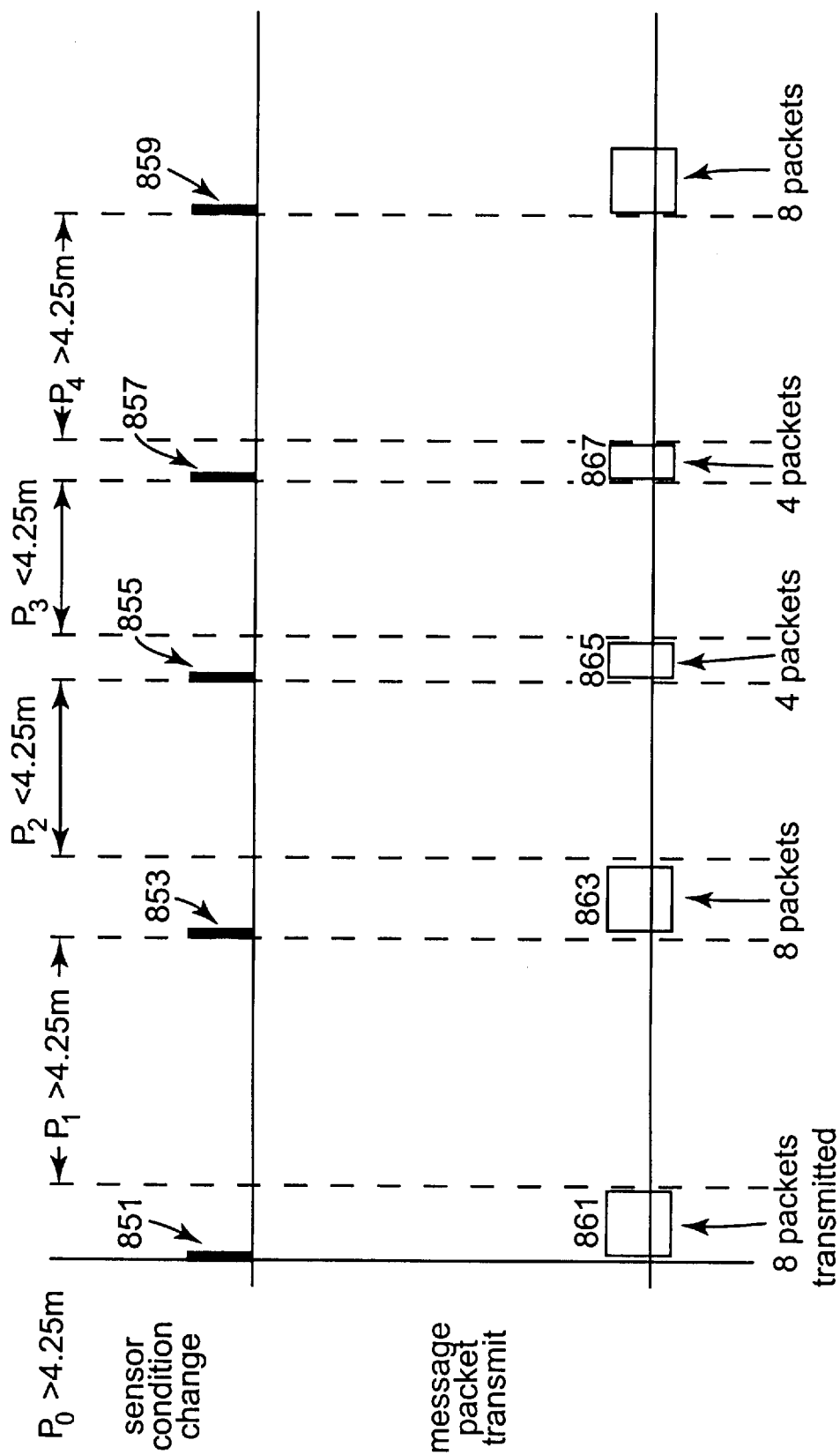
FIG. 12 shows a theoretical timing chart of message packet transmission.

In another embodiment, for the period zero to about four minutes, four packets are sent, and the period after about four minutes, eight packets are sent. An example of this embodiment is shown in FIG. 12. FIG. 12 shows a theoretical timing example for five successive message packet transmission sequences from a single transmitter using such a method.

In FIG. 12, each of the five pulses 851, 853, 855, 857 and 859 corresponds to the triggering of a sensor 803. The leading edge of pulse 851 occurs at time=0. The time interval since the last packet transmission from the previous trigger (not shown) is $P_0$, which has a value greater than a predetermined value (e.g., 4.25 minutes). Because the time interval between the end of the last packet transmission from the previous trigger and current trigger in this case is greater than 4.25 minutes, the number of redundant message packets to be sent to the system controller is set to its "normal" or default value (e.g., 8). Consequently, the occurrence pulse 851 causes the transmitter to send a set 861 of eight redundant message packets.

Similarly, because the calculated time interval $P_1$ between the end of the last packet transmission from pulse 851 and beginning of pulse 853 is greater than 4.25 minutes, pulse 853 causes the transmitter to send a set 863 of eight redundant message packets.

In contrast, because the calculated time interval $P_2$ between the end of the last packet transmission from pulse 853 and beginning of pulse 855 is less than 4.25 minutes, the number of redundant message packets to be sent is automatically reduced to a predetermined value (e.g., 4). Accordingly, pulse 855 causes the transmitter to send a set 865 of only four redundant message packets.

Similarly, because the calculated time interval $P_3$ between the end of the last packet transmission from pulse 855 and beginning of pulse 857 is less than 4.25 minutes, pulse 857 causes the transmitter to send a set 867 of four redundant message packets.

With the next pulse 859, the calculated time interval $P_4$ between the last packet transmission from pulse 857 and beginning of pulse 859 once again becomes greater than 4.25 minutes. Accordingly, pulse 859 causes the transmitter to send a set 869 of eight redundant message packets.

As is apparent from the above embodiment, other embodiments may include any number of time intervals with a number of redundant packets associated with the interval. Also, the duration any time interval may be fixed according to the particular application.

Figure 1:
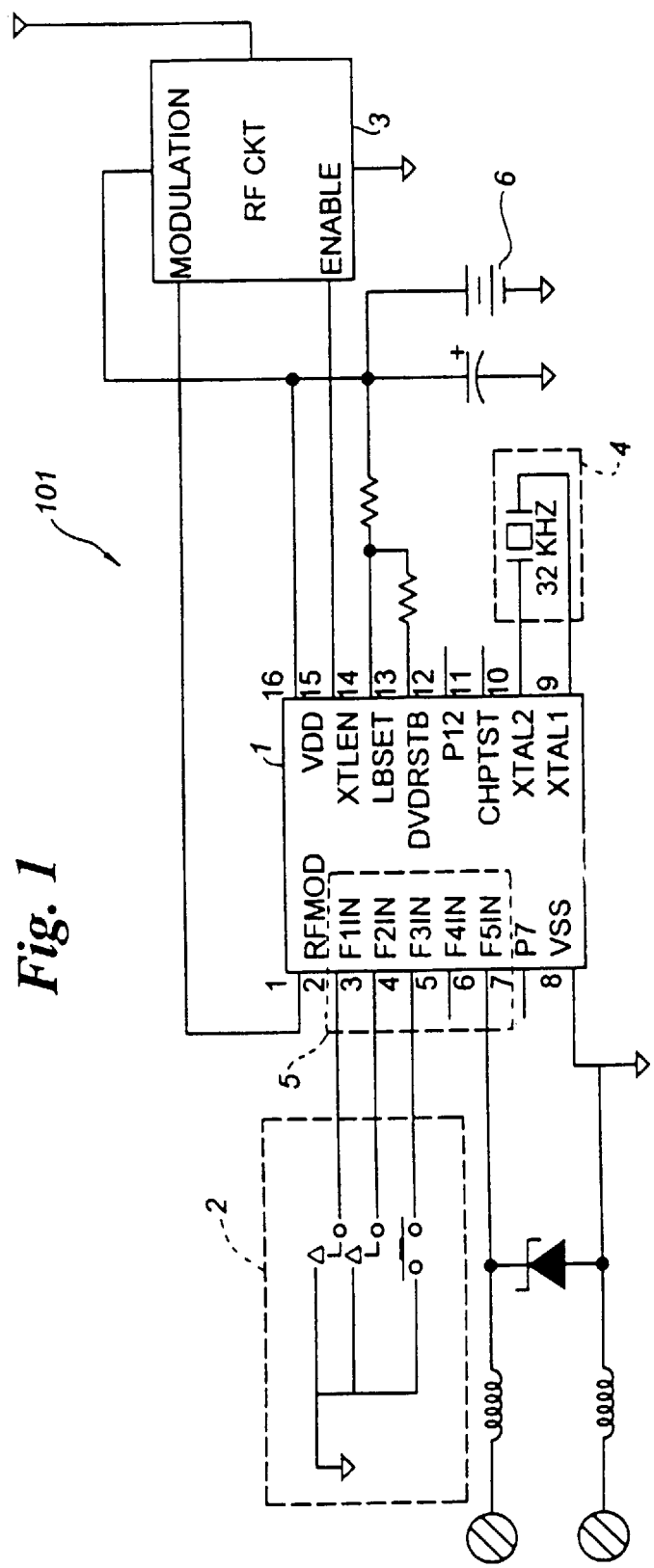
FIG. 1 is a block diagram of a wireless sensor system.

One embodiment of transmitter 803 is shown in FIG. 1. A wireless sensor system 101 includes a single-chip transmitter 1 to which sensors, e.g., a door sensor 2 (e.g., model no. 60-362 available from Interactive Technologies Inc., North St. Paul, Minn.) may be connected. When the door opens or closes, the change in condition is detected at sensor inputs 5. Transmitter 1 responds to the change by generating a message, in packets, and sending them wirelessly via an RF modulation circuit 3 to a distant system controller (805 in FIG. 11). The system controller decodes the message, and determines whether to send an alarm to a monitoring station (807 in FIG. 11). Transmitter 1 is clocked by a 32 kHz crystal 4. The system is powered by battery 6. Other kinds of sensors can be served, including window sensors, motion detectors, sound detectors, heat detectors, and smoke detectors.

Figure 2:
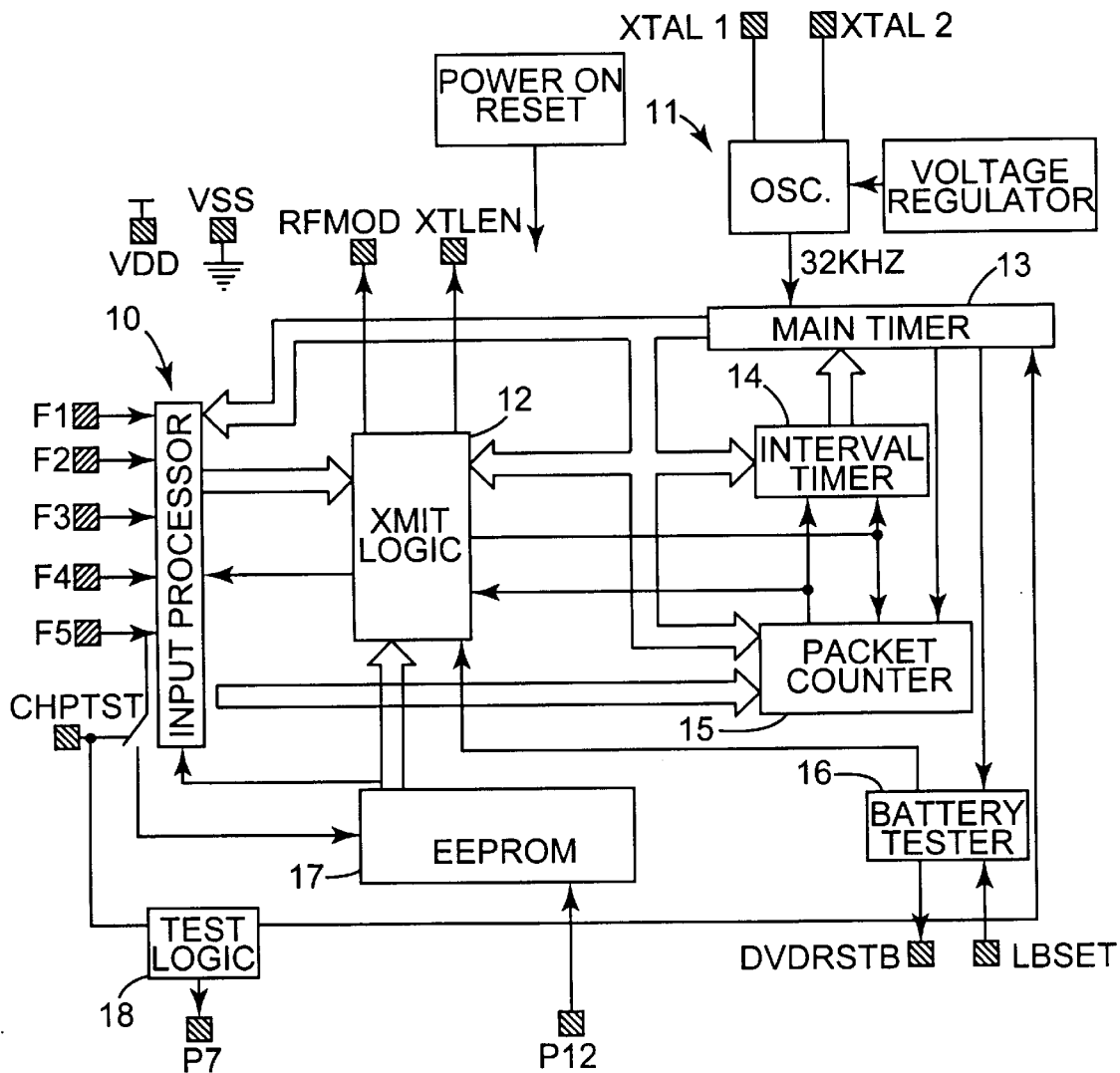
FIG. 2 is a block diagram of the single-chip transmitter of FIG. 1.

As shown in FIG. 2, the main functional components of transmitter 1 include: (1) sensor input processors 10; (2) transmission logic 12, which generates packets based on sensor inputs; (3) main timer 13, which receives clock ticks from a low power oscillator 11 and generates corresponding timing signals based on the external 32 kHz crystal 4; (4) interval timer 14 for generating pseudo-random intervals between successive packets; (5) packet counter 15 for counting the number of packets sent during a transmission; (6) battery tester 16 for testing the supply battery voltage; (7) EEPROM 17 for storing data and program information; and (8) test logic 18 for internal testing of the transmitter.

The five sensor inputs 5 appear at pins F1IN through F5IN of the transmitter 1. Each input 5 has an associated input processor 10. Input processors 10 are scanned simultaneously every 250 ms. Uninterrupted simultaneous sensing of all inputs would be impractical for a battery-powered sensor system in which the battery is expected to last for a relatively long period, e.g., five years or more.

A change in an input signal level (reflecting a change in the sensor condition) is disregarded unless it appears in two successive scan cycles. Therefore, an input signal change must be present for at least 250 ms to be accepted. Optionally, the scanning cycle may be reduced to 31 ms. The shorter scanning cycle is used in applications where a 250 ms scan is inconvenient for the system user, e.g., when a key fob is used to active/deactive a system.

Among the other pins of transmitter 1 is RFMOD which provides an output message to RF modulation circuit 3. Pin P7 provides an output of a low battery comparator associated with battery tester 16 when pin CHPTST is set to logic "1". VSS and VDD receive negative and positive supply voltage, respectively. XTLEN carries an enable signal to RF modulation circuit 3. LBSET carries a low battery threshold voltage input. DVDRSTB delivers a strobe divider output. Pin P12 receives an EEPROM programming shift clock. CHPTST receives a chip test input signal. XTAL1 and XTAL2 are connected to 32 kilohertz (kHz) crystal 4.

Input scanner 11 receives several clock signals from main timer 13, including DCLKL, KCLK, NCLK, and BCLK. Input scanner 11 also receives signal FSCAN which corresponds to bit EP31 in EEPROM 17. FSCAN controls the scan cycle; when FSCAN is a logic "0" the scan cycle is 250 ms, and when FSCAN is a logic "1" the scan cycle is 31 ms.

Figure 3A:
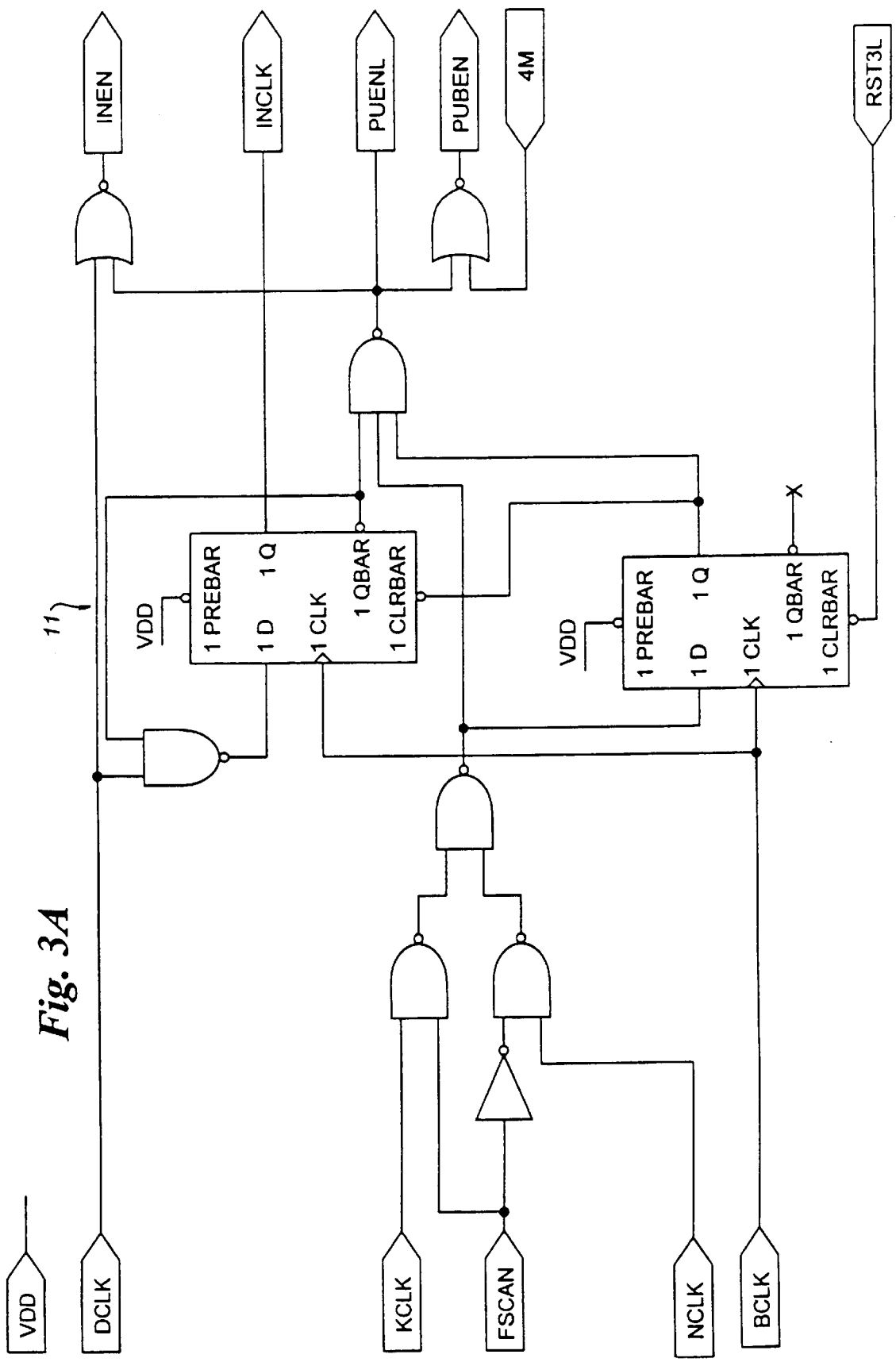
FIG. 3A is a block diagram of an input scanner.
Figure 3B:
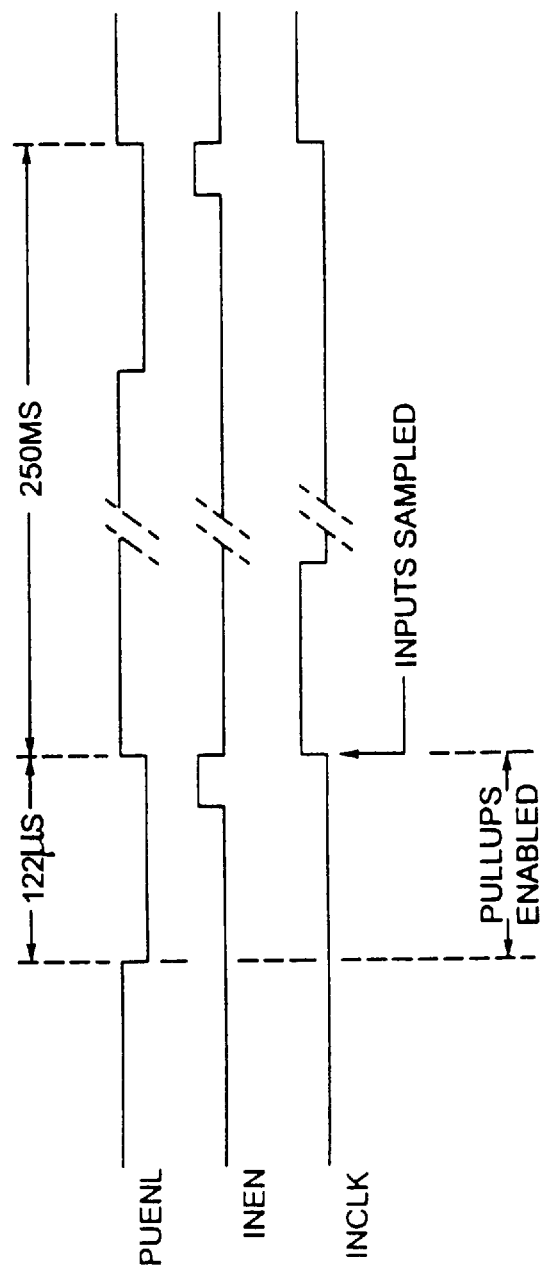
FIG. 3B is a timing diagram for the input scanner.

As shown in FIG. 3A, input scanner 11 generates four output signals, INEN, INCLK, PUENL, and PUBEN to control the detection of inputs 5 by their respective input processors 10. As shown in FIG. 3B, just before the beginning of a scanning cycle, PUENL goes low (logical 0) for about 122 μs to allow any transitional signals (caused by capacitance or noise) to settle. The beginning of the cycle is signaled when INEN goes to a logical 1. At the start of the cycle INCLK goes high and stays high while inputs are being scanned. All inputs are scanned simultaneously.

Figures 1, 4A:
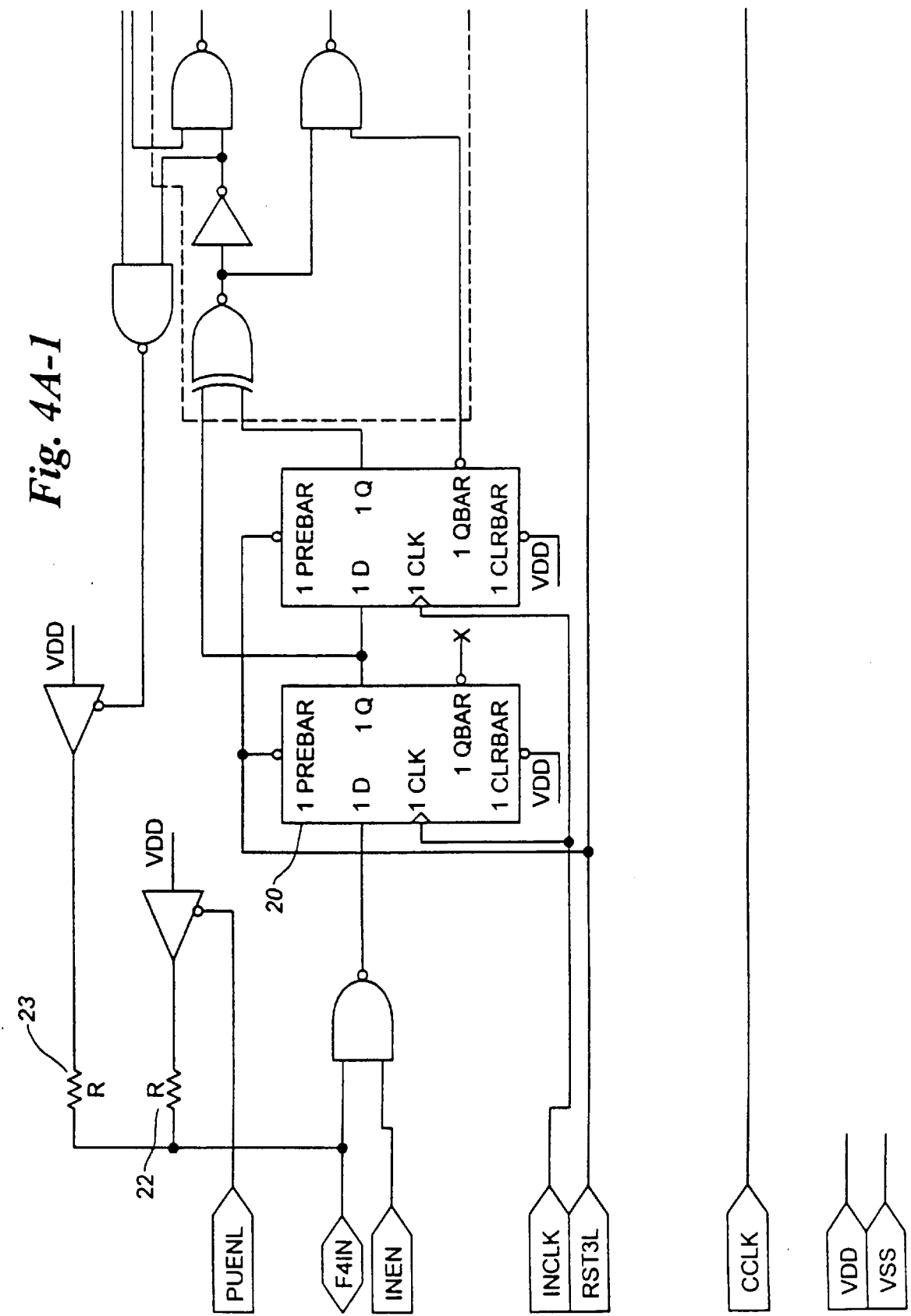
FIGS. 4A through 4D are block diagrams of input processing circuits for four inputs of the transmitter.
Figures 2, 4A:
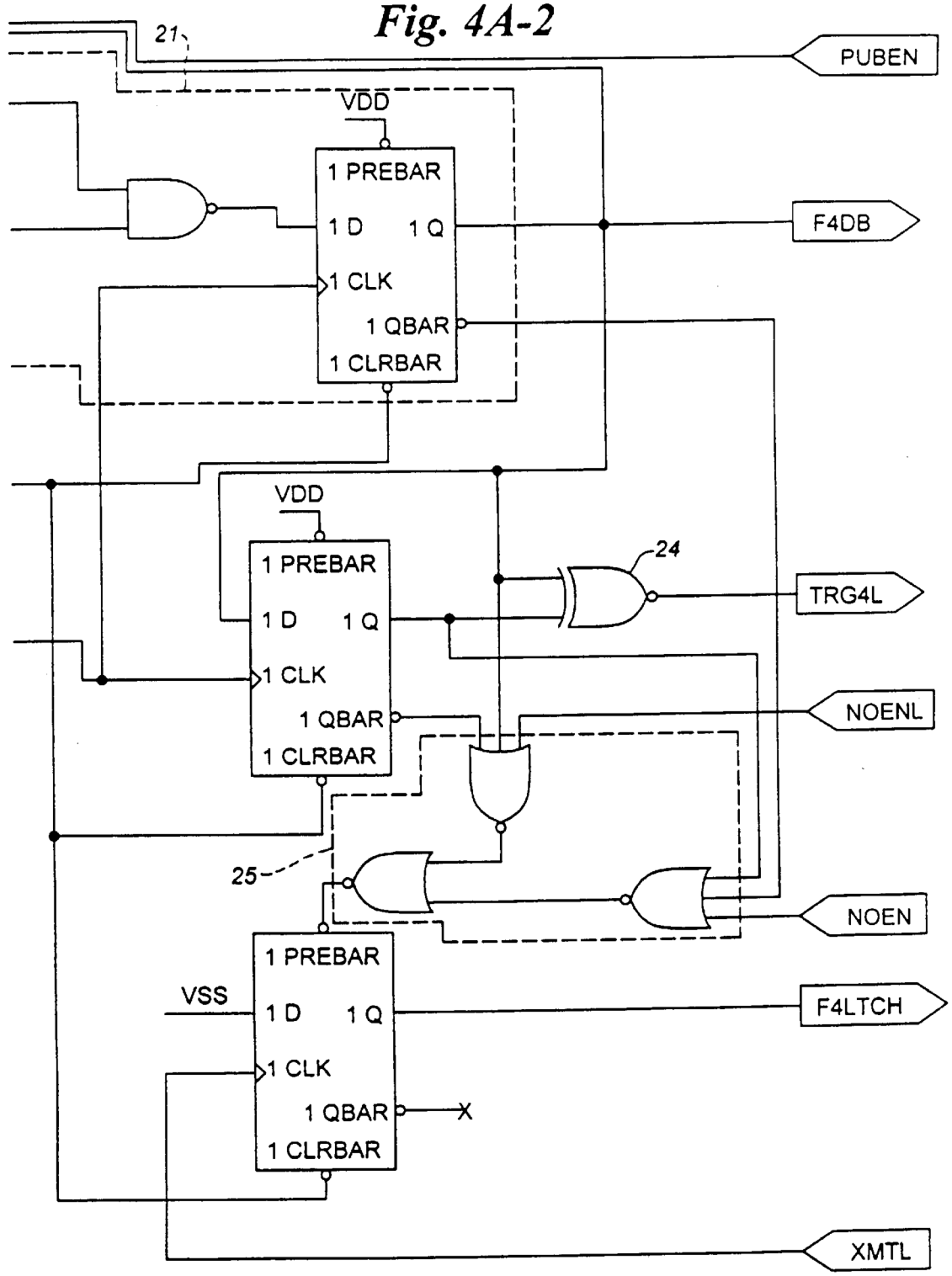

As shown in FIG. 4A, INEN is gated with sensor input signal F4IN. On the rising edge of INCLK, the gated F4IN signal is latched into flip-flop 20. The latched input signal is then processed by debounce circuitry 21 to yield debounced signal F4DB as an output.

Figures 1, 4B:
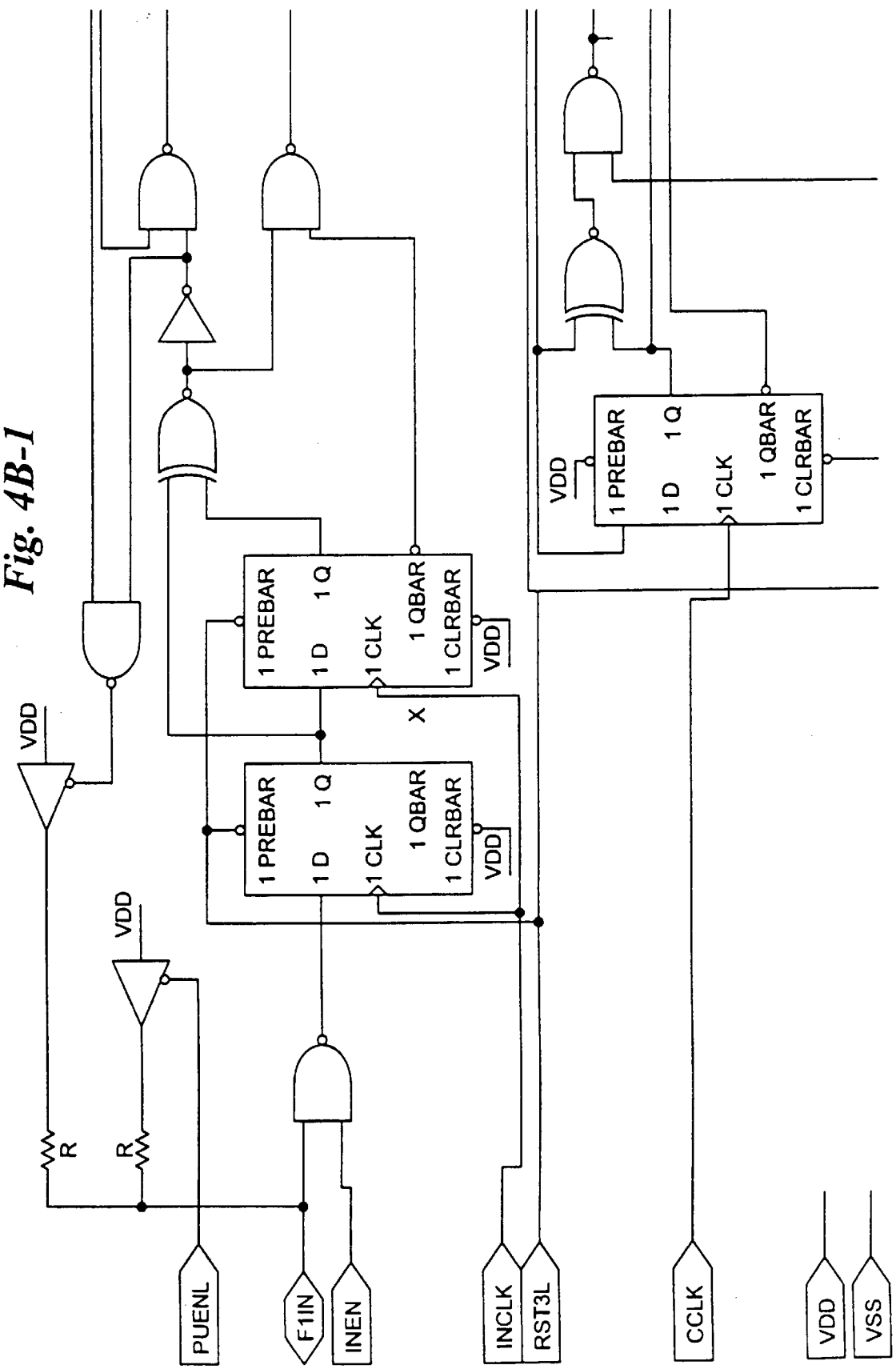
Figures 2, 4B:
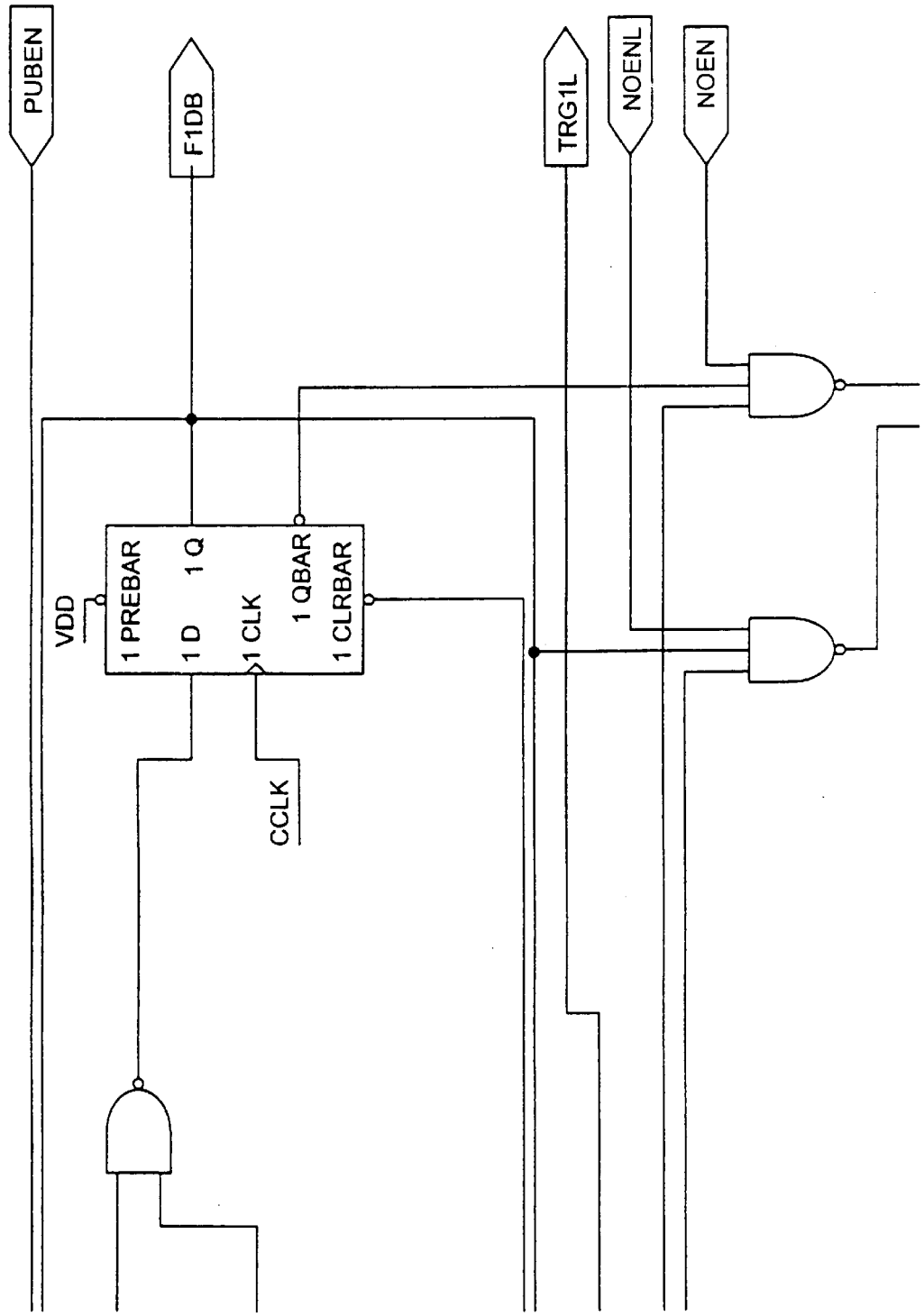
Figures 3, 4B:
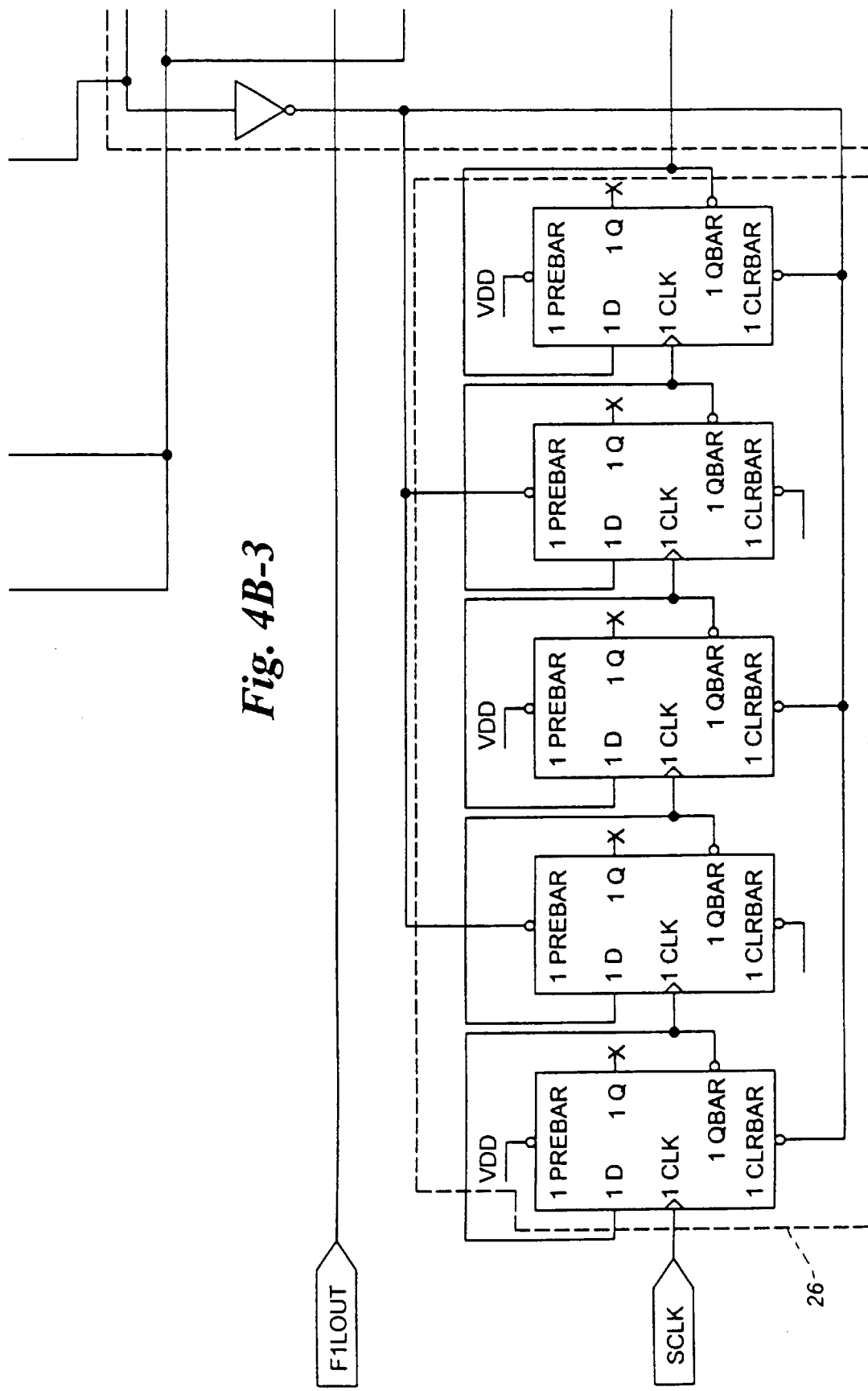
Figure 4B:
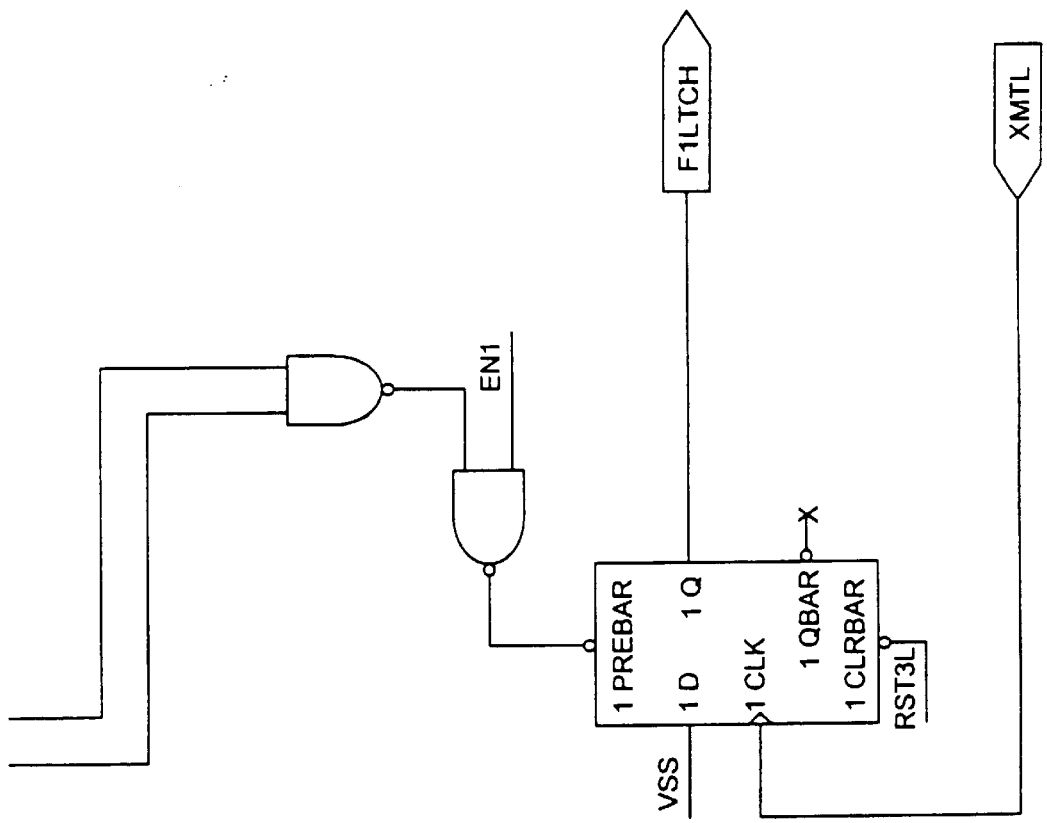
Figure 4:
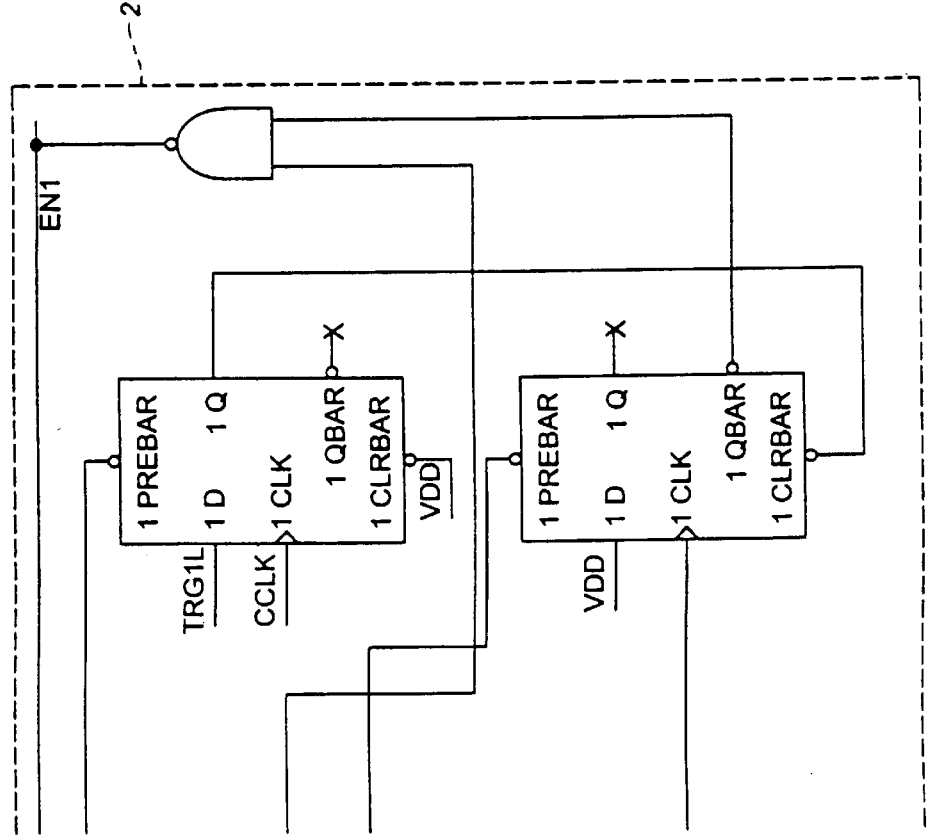
Figures 1, 4C:
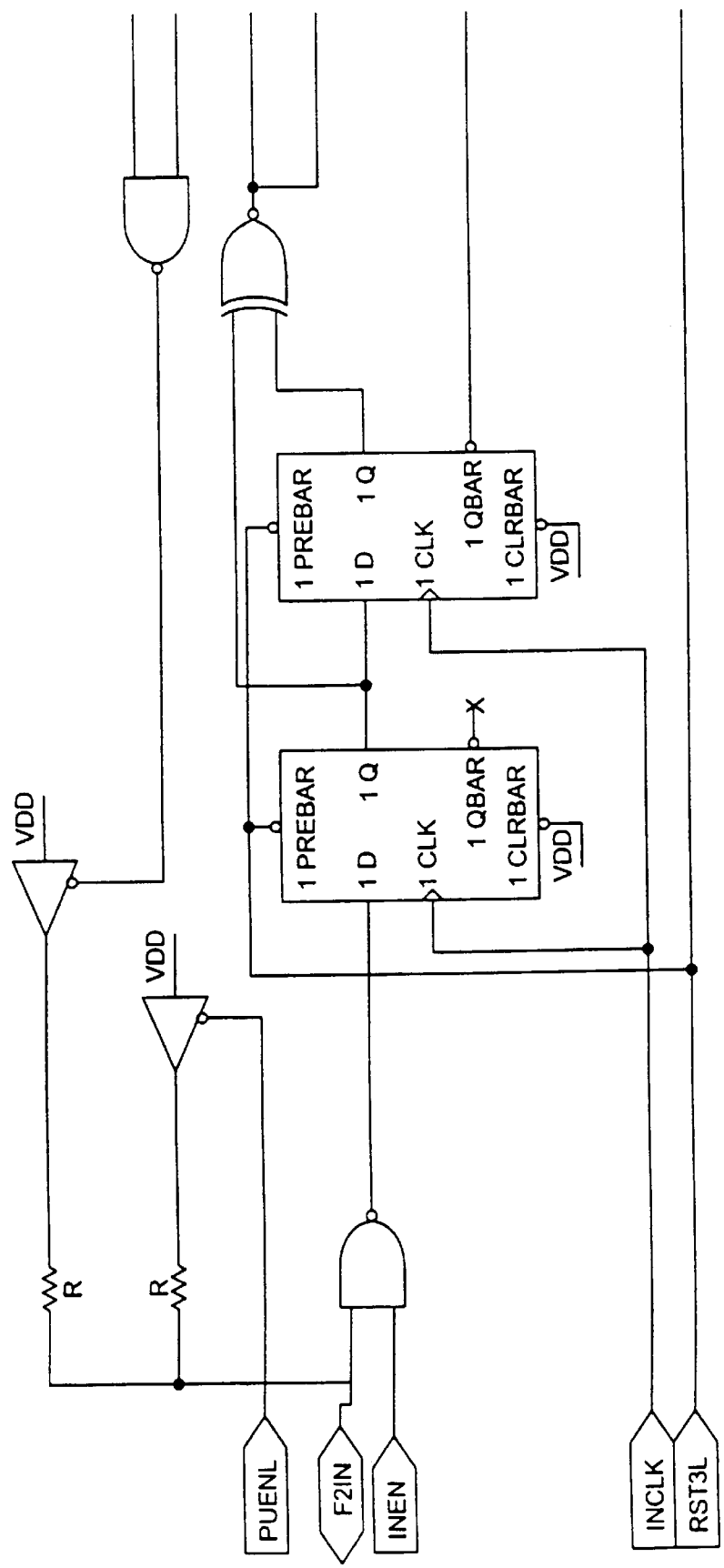
Figures 2, 4C:
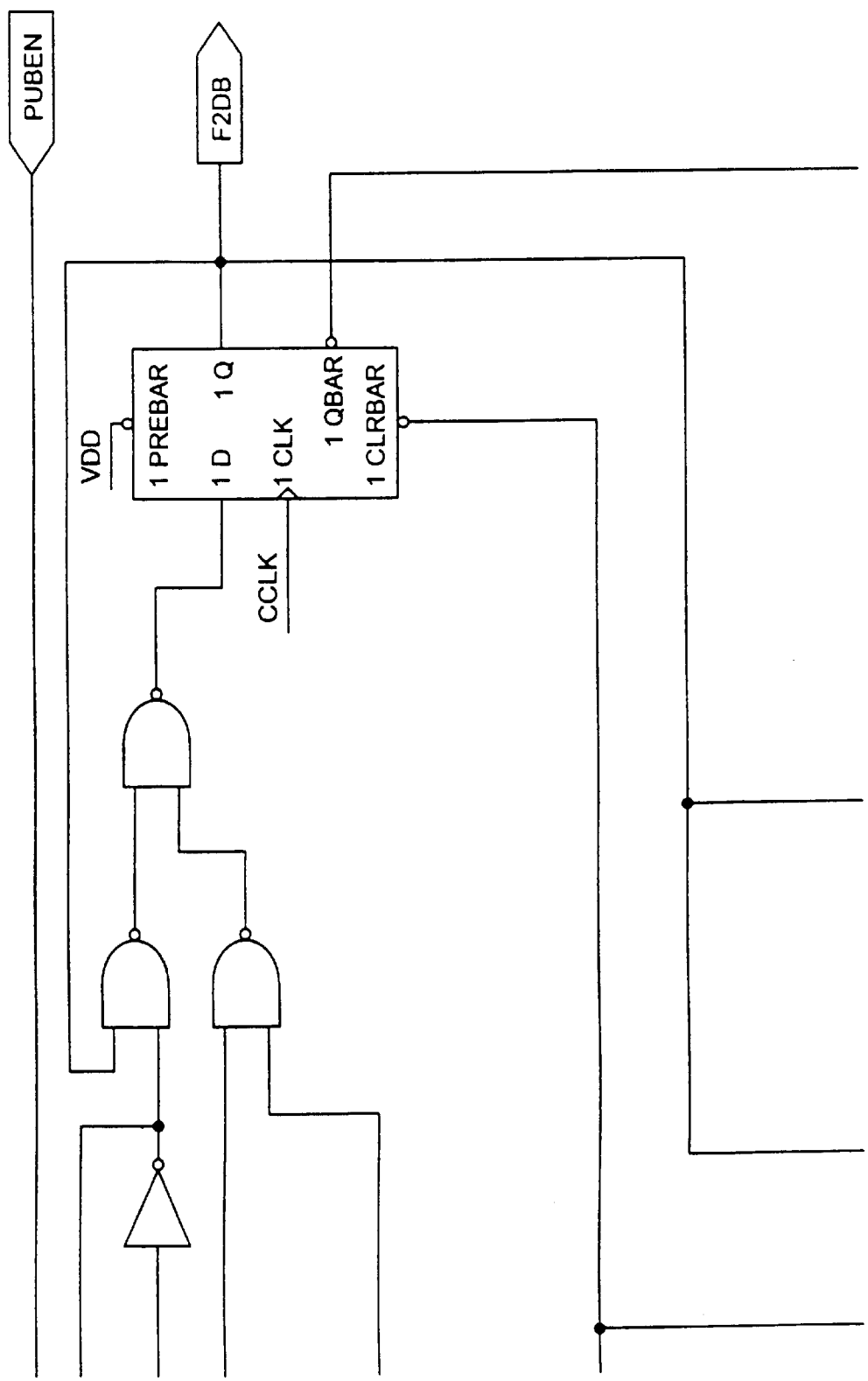
Figures 3, 4C:
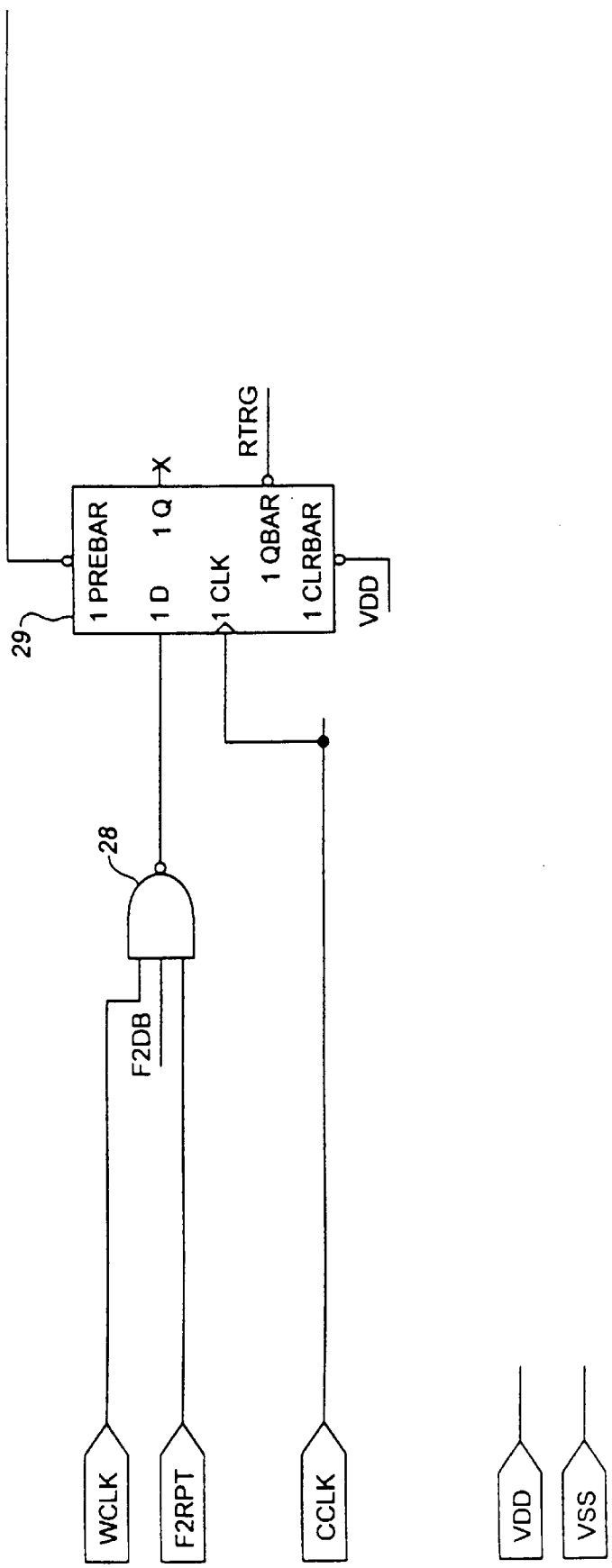
Figures 4, 4C:
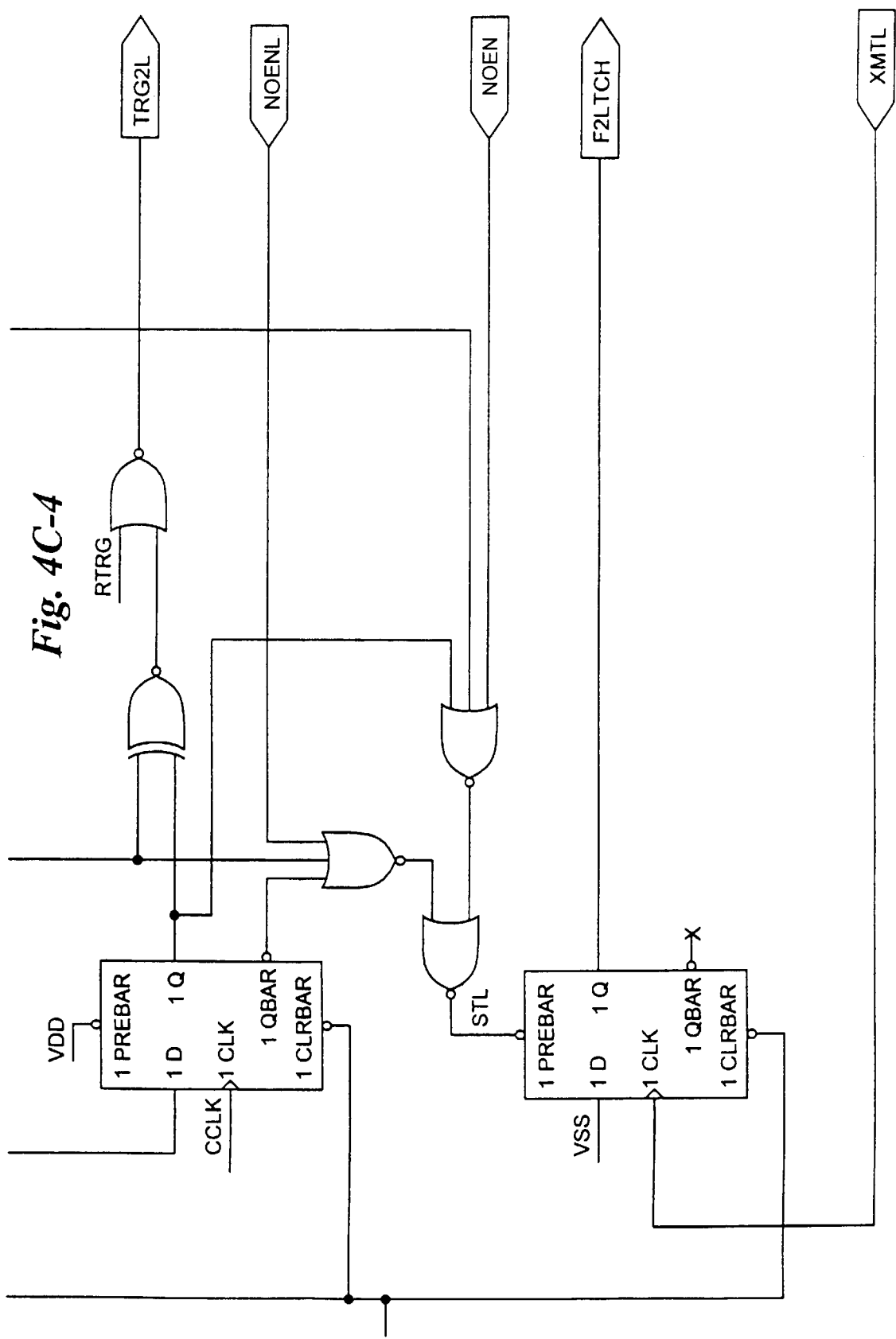
Figures 1, 4D:
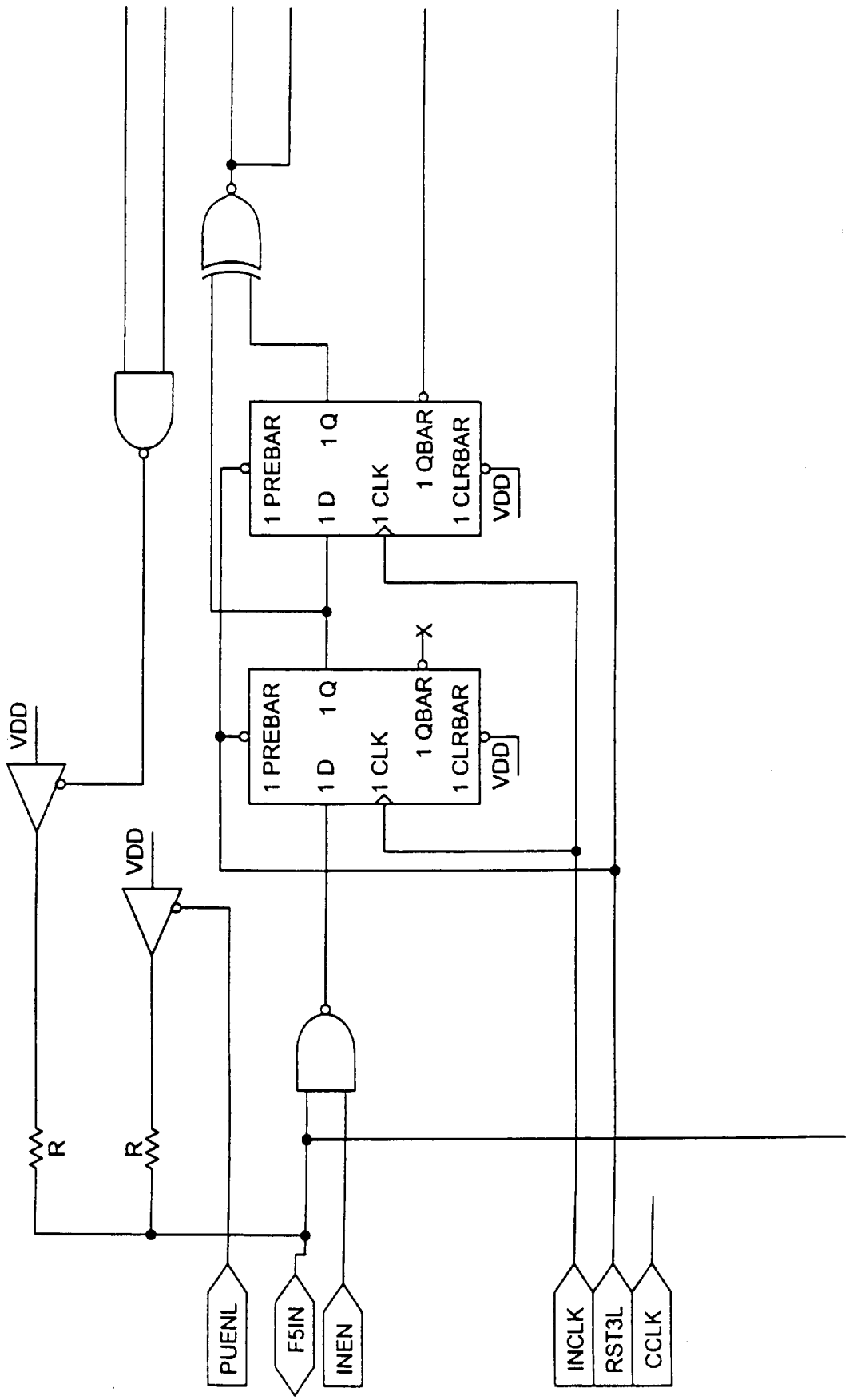
Figures 2, 4D:
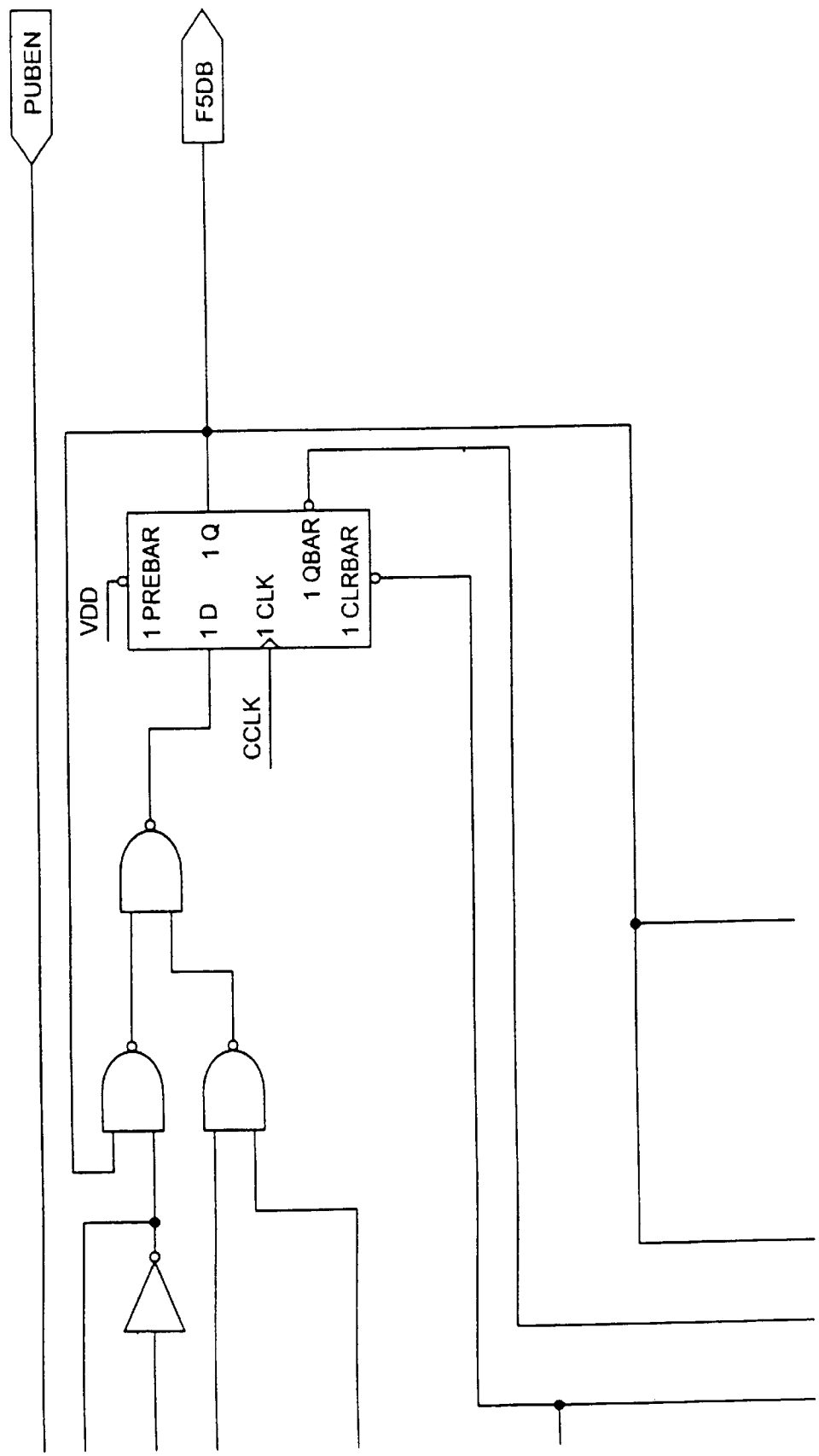
Figures 3, 4D:
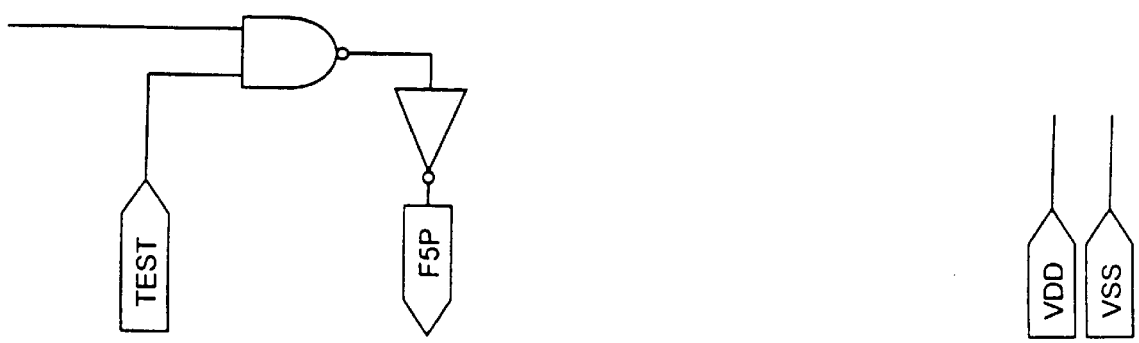
Figures 4, 4D:
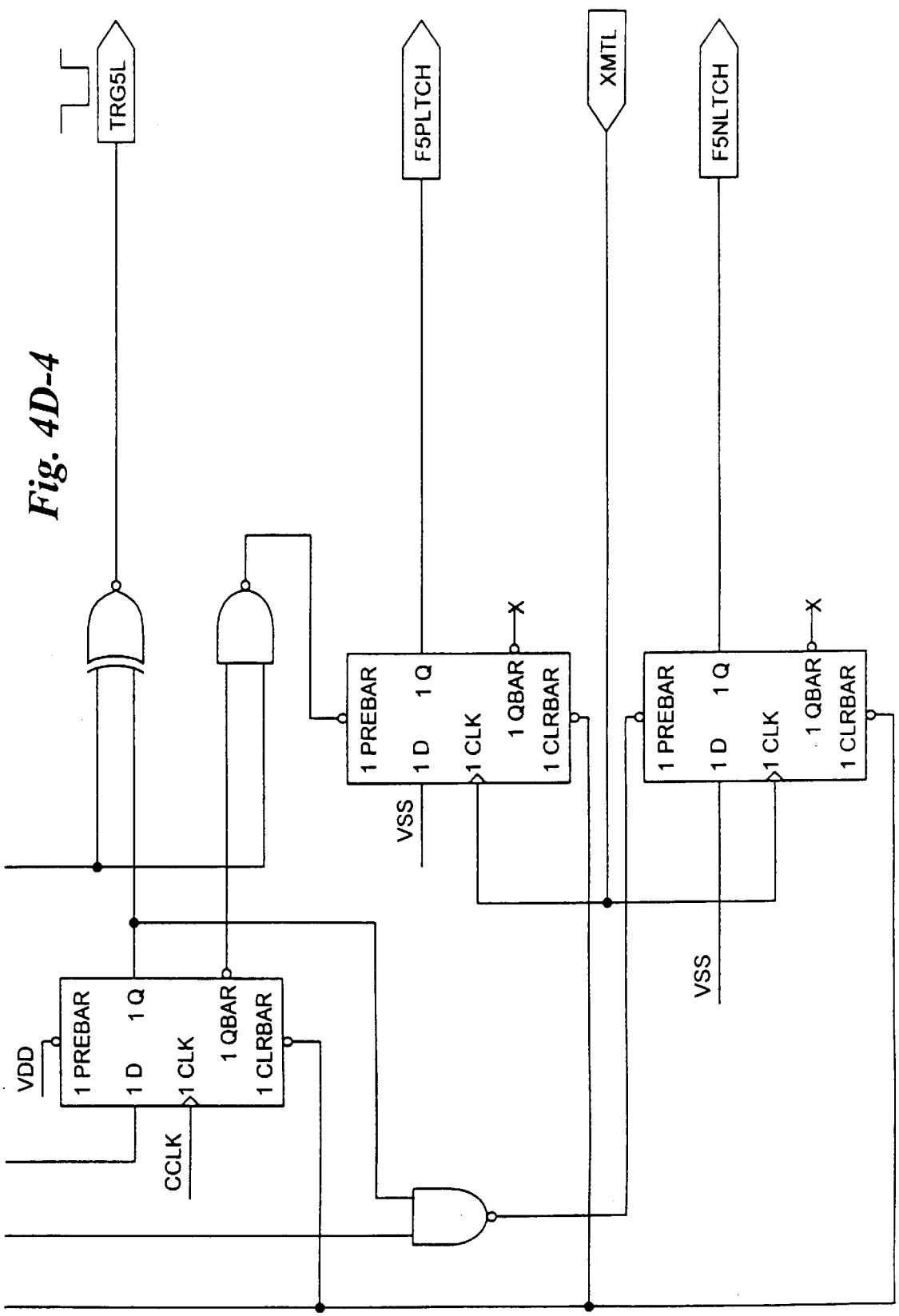

The input processors 10 for input signals F1IN, F2IN, and F5IN are shown in FIGS. 4B through 4D; the input processor for input signal F3IN is the same as in FIG. 4A. FIGS. 4B through 4D show additional processing circuitry that is specific to the associated input pins. In alternative implementations, the input processor for any given pin could have selected features from any of the FIGS. 4A–4D.

During scanning, the input pin is connected via a pull-up resistance to a voltage source VDD. As seen in FIG. 4A, this is accomplished by signal PUENL which switches in a relatively large (roughly 24 k ohm) pull-up resistance 22 (a resistor or a transistor); the larger resistance value causes a smaller current, thereby reducing battery drain. To reduce dendrite build-up, each input processor 10 includes a second smaller pull-up resistor 23 (roughly 5 k ohm). The larger current resulting from smaller pull-up resistor 23 reduces or blows away dendrite short circuits that may be forming on the traces of the circuit board connected with the input pins.

The development of parasitic parallel resistances, such as dendrite build-up on the circuit board, may cause an input processor 10 to initiate the generation of message packets indicating a change in condition, when no such change has actually occurred. For example, a door sensor 2 indicates whether the door is open (seen at the input pin as a logical 1) or closed (seen at the input pin as a logical 0). When the door is open, different voltage potentials exist between the copper traces on the circuit board. Dendrite particles on the circuit board are attracted to the voltage differential and can form a short circuit from trace to trace.

The short circuit causes a logical 0 to appear at the input pin. To the input processor 10, this looks the same as if the door sensor 2 has gone from an open-to-closed condition. Transmitter 1 will then send a message containing incorrect information. Once the dendrite-induced short circuit is established, it is possible that the door may be opened and closed numerous times without the transmitter 1 generating and sending packets which reflect the actual changes in condition.

Dendrite short-circuits and other types of parasitic parallel resistance are eliminated or overcome by using two pull-up resistors 22, 23. The first pull-up resistor 22 is normally used to switch in the power supply when the input processors 10 are scanned. The resistance value of pull-up resistor 22 is selected to activate the circuit with a low current, thereby conserving the battery. However, the current generated by pull-up resistor is not sufficient to destroy or overcome a dendrite-induced short circuit. Therefore, if a change of condition is detected, e.g., the signal at the input pin goes from logical 1 to logical zero, a second pull-up resistor 23 is used to switch in the battery. The resistance value of pull-up resistor 23 is selected to generate a current sufficient to destroy or overcome dendrite-induced short circuits. This two-resistor scheme eliminates or reduces false information from being generated by transmitter 1 (by selectively using a high current) without significantly increasing the energy requirements (by normally using a low current).

As discussed above, each input processor 10 is scanned about once every 250 msec. In addition to reducing the energy requirements of the transmitter, scanning helps reduce dendrite build-up in two ways. First, periodic scanning as opposed to a constant scan greatly reduces the time period when voltage differentials exist, thereby reducing the conditions under which dendrite short circuits form. Second, periodic scanning allows for larger currents on each scan. The larger currents are more likely to destroy dendrite build-up.

During scanning, the input pin is connected via a pull-up resistor to a voltage source VDD. As seen in FIG. 4A, this is accomplished by signal PUENL, which switches in either a relatively large (roughly 24 k ohm) pull-up resistor 22 (a resistor or a transistor), or a relatively smaller, second pull-up resistor 23 (roughly 5 k ohm). During periods when no change in condition occurs, relatively large pull-up resistor 22 is used to switch in voltage source VDD. The larger resistance value creates a smaller current, reducing the drain on the transmitter battery 6. This smaller current may have little or no effect on short circuits created by dendrite build-up.

If a change of condition is detected between scan cycles (e.g., logical 1 to logical 0), the smaller pull-up resistor 23 is used to switch in voltage source VDD on the next scan cycle. The smaller pull-up resistor 23 creates a larger current sufficient to destroy or overcome dendrite short circuits. In another embodiment, the small pull-up resistor 23 is used to switch in VDD immediately upon a change in condition.

If dendrite build-up has created a short circuit, the input processor will detect a change of condition from open to closed (logical 1 to logical 0). On the next scan cycle, smaller pull-up resistor 23 is connected with voltage source VDD and the larger current destroys the short circuit. The input processor will now detect a change in condition from closed to open (logical 0 to logical 1). Therefore, input processor 10 will not generate a TRGxL signal (discussed below) and the transmitter 1 will not generate message packets indicating a change in condition because a change in condition has not been detected for two consecutive scan cycles.

As discussed above, in another embodiment, the small pull-up resistor 23 is used to switch in VDD immediately upon a change in condition, as opposed to waiting for the next scan cycle. Therefore, at the end of the scan, after smaller pull-up resistor 23 is used to destroy the dendrite short circuit, the condition detected by input processor 10 will be the same as the previously detected condition.

The smaller pull-up resistor 23 is not used on every scan cycle because it will drain the battery more rapidly than resistor 22. As discussed above, it is important to maximize the life of battery 6 associated with wireless transmitter 1. Therefore, in the present invention, the smaller resistor 23 is only switched into the circuit when a change in condition has first been detected by a larger resistor, e.g., resistor 22.

Limiting the use of smaller resistor 23 extends the battery life while at the same time preventing or reducing incorrect information being sent to the system controller due to dendrite-induced short circuits.

As an example, one can compare three ways to energize input processor 10. First, a non-pulsed, single pull-up resistor can be used. Second, a pulsed, single pull-up resistor can be used. Finally, the pulsed, 2-stage resistance of the present invention can be used. In the first case, the pull-up current (I) must be minimized to maintain a suitably long battery life, e.g., $1\mu$ amp, limiting the battery draw $1\mu$ amp. The parasitic parallel resistance at failure (0.5 V/I) is about 1.8 M$\Omega$. Therefore, this circuit is very sensitive to parasitic parallel resistance.

In the second case, using the scanning sequence disclosed above, a larger pull-up current I, e.g., $150\mu$ amps, can be used, while decreasing the battery draw (due to scanning) to $0.075\mu$ amps. The parasitic parallel resistance at failure is now about 12 K$\Omega$.

In the third case, i.e., the present invention, the second pull-up resistor generates a larger current, e.g., $750\mu$ amps. The normal battery draw is still about $0.075\mu$ amps. However, when the second resistor is used, the parasitic parallel resistance at failure is now about 2.4 K$\Omega$. Therefore, a circuit that implements the two resistor scheme is much less susceptible to parasitic parallel resistance.

In one embodiment, pull-up resistor 23 is used following any detection of a change in condition, i.e., open-to-closed or closed-to-open. In another embodiment, pull-up resistor 23 is used only when the change in condition is open-to-closed.

An additional feature to balance the requirements of battery conservation and dendrite reduction is the use of a lockout period. Once the smaller pull-up resistor 23 is used in a scanning cycle, pull-up resistor 23 is not used for a predetermined time period. The time period is selected to balance battery conservation with the likelihood of dendrite build-up. In one embodiment, the lockout period is about 4.25 minutes.

The lockout feature is implemented as shown in FIG. 3A by generating signal PUBEN, enabled by signal 4M from packet counter 15.

The selective use of pull-up resistors can be used to overcome other types of short circuits in addition to dendrite-induced short circuits. There are various situations where a short circuit can unexpectedly develop between parallel resistors. In many of these instances it would be advantageous to switch in a higher current that can eliminate or overcome a short circuit once a possible short circuit is identified by a current more suitable to normal operating conditions.

Among the other signals received by input processor 10 are CCLK, from main timer 13, which provides a 122 $\mu$s clock pulse, NOEN and NOENL which both derive from bit EP27 in EEPROM 17, and determine whether the latched input signal FxLTCH is set on a low-to-high input signal transition (for sensors that are normally closed) or on a high-to-low signal transition (for sensors that are normally open). Signal XMTL is generated from packet counter 15 and resets the latched input signal FxLTCH at the end of a message transmission.

Each debounced signal FXDB is fed to gate 24, along with a timing pulse derived from CCLK, to generate signal TRGxL that triggers both transmission logic 12 and packet counter 15. Debounced input signal FxDB is also processed by gates 25 to generate latched input signal FxLTCH.

As shown in FIG. 4B, the input processor for pin F1IN includes a lock-out timer which is used with a sensor of the kind that triggers constantly during certain periods (e.g., a passive infrared motion detector). The lock-out timer reduces the volume of messages, saving the battery. The lock-out function is enabled by signal F1LOUT from EEPROM 17, bit EP24. Flip-flops 26 form a 168 second (approximately) timer using SCLK as a clock input. Lockout circuit 27 disables signals TRG1L and F1LTCH for about 168 seconds after a TRG1L signal.

As shown in FIG. 4C, input processor 10 for input pin F2IN includes a repeater function which is useful with critical sensors such as a smoke detector. The repeater function is achieved using gate 28 and flip-flop 29. Gate 28 has as inputs WCLCK (clock ticks appearing every 64 seconds), debounced signal F2DB, and the repeater enable signal F2RPT from EEPROM 17, bit EP26. This circuit initiates signal TRG2L every 64 seconds, causing generation of another group of message packets. Thus, as long as a sensor active signal is detected, i.e., pin F2IN is high, the system controller will receive the sensor message approximately every minute and will send repeated alarm messages to the monitoring station.

As shown in FIG. 4D, input processor 10 that serves pin F5IN includes elements that latch the debounced signal F5DB on both the rising and falling edges of the signal transition F5PLTCH and F5NLTCH, respectively. This configuration provides flexibility by accepting sensors that are in a normally open or closed state.

Each message generated by transmitter logic 12 is configured as a sixty-four bit data packet. Normally a series of eight identical data packets are transmitted for each qualified input signal change to assure that the system controller will reliably receive the message notwithstanding battery drain, overloading of the system by messages coming into the system controller, and other factors. If transmitter 1 is re-triggered by a sensor signal change while a group of packets is already being transmitted, the ongoing transmission of that group of packets is completed, then eight more packets are transmitted with the newer data.

Optionally, transmitter 1 may generate a group of only four packets for each qualified signal change during periods of frequent sensor triggering as a way to reduce battery drain. After the first series of eight packets is sent, if a subsequent input change is detected within 4.25 minutes of the end of the last packet transmission, then only four packets are sent. Otherwise, eight packets are sent.

Each packet carries sensor data and identification and includes sixty-four bits:

| Bits | Description |
| --- | --- |
| 00–02 | 976 $\mu$s RF front porch pulse |
| 03–14 | 12 sync pulses, logical zeros |
| 15 | start pulse, logical one |
| 16–35 | 20 bit sensor identification code (ID bits 0–19) |
| 36–39 | 4 bit device type code (DT bits 0–3) |
| 40–42 | 3 bit trigger count (TC bit 0–2) |
| 43 | low battery bit |
| 44 | F1 latch bit |
| 45 | F1 debounced level |
| 46 | F2 latch bit |
| 47 | F2 debounced level |
| 48 | F3 latch bit |
| 49 | F3 debounced level |
| 50 | F4 latch bit |

-continued

| Bits | Description |
| --- | --- |
| 51 | F4 debounced level |
| 52 | F5 positive latch bit |
| 53 | F5 debounced level |
| 54 | F5 negative latch bit |
| 55 | even parity over odd bits 15–55 |
| 56 | odd parity over even bits 16–56 |
| 57 | zero/one, programmable |
| 58 | RF on for 366 µs (old stop bit) |
| 59 | one |
| 60–62 | modulus 8 count of number of ones in bits 15–54 |
| 63 | zero (new stop bit) |

Figure 5A:
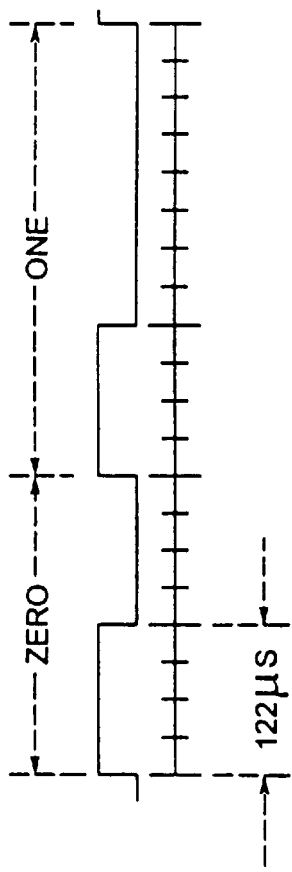
FIG. 5A is a timing diagram of bit values.
Figure 5B:
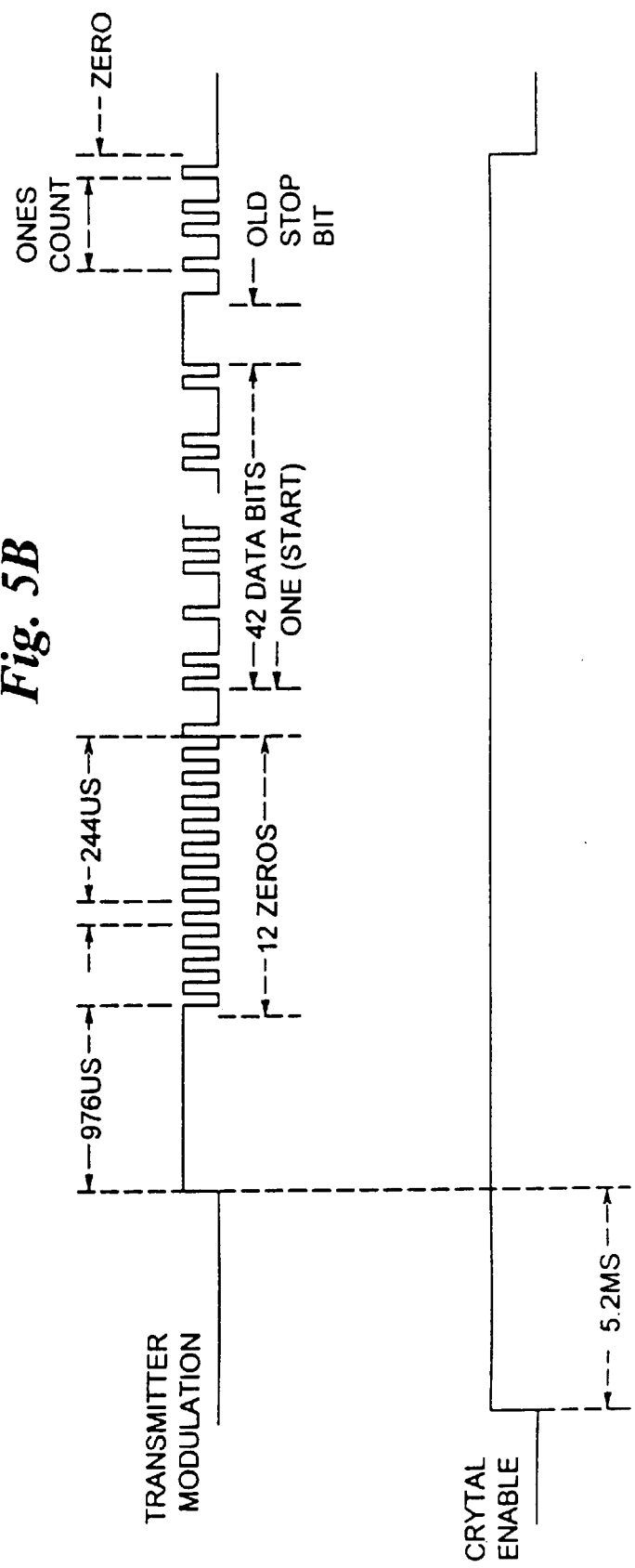
FIG. 5B is a timing chart of a packet.

As shown in FIG. 5A, transmitter 1 uses pulse-width modulation to generate logical 1's and 0's. A 1 bit has 122 µs RF on and 244 µs RF off, a 0 bit has only 122 µs RF off. As shown in FIG. 5B, crystal enable pin, XTLEN, goes high approximately five ms before the start of each packet transmission and remains high until the end of the packet transmission.

The interval between successive packets in a group is varied pseudo-randomly from about 93 ms to 453 ms.

If about an hour elapses without a packet transmission, the main timer 13 will automatically cause transmitter 1 to send three, identical supervisory data packets each having the same configuration as for other packets. The quiet interval which ends in the supervisory packets being sent is varied in a pseudo-random manner from about 64 minutes to 68 minutes. Alternatively, the supervisory signals may be sent after a quiet period of only sixty-four seconds. The sixty-four second supervisory is used in high security applications, e.g., home incarceration.

EEPROM 17 stores 36 control bits. Bits EP00 to EP19 provide 20 sensor identification code bits. Bits EP20 to EP23 provide four device type bits (e.g., 0101 for a smoke detector). Bits EP32 to EP34 provide three band gap accuracy trim bits used with battery tester 16.

EEPROM bits EP24 to EP31 provide programming options. When EP24 is set to logical 1, it enables the three minute lock-out function as described above regarding FIG. 4B. When EP25 is set to logical 1, the supervisory interval is shifted from approximately one hour to sixty-four seconds. When EP26 is set to logical 1, the repeater function will trigger data transmissions every sixty-four seconds. When EP27 is set to logical 0, the input latch signals FxLTCH are set on the low to high input signal transition. For EP27 set to logical 1, the input latch signals FxLTCH are set on the high to low input transition.

EP28 controls the number of packets transmitted for each sensor trigger (logical 0 yields eight packets per group; logical 1 yields eight packets for more than 4.25 minutes from the end of the last packet transmission, otherwise only four packets).

When EP29 is logical 1, bits 60 to 63 of the packet are not transmitted, making the transmitter compatible with sixty bit systems. EP30 controls the value of bit 57. Bit 57 can be used as an additional bit to identify the device type. EP31 set to logical 1 increases the input scan cycle rate to 32 scans per second. When EP35 is set to logical 1, transmitter 1 delivers a 32 kHz signal on pin P7, otherwise 32 Hz.

The EEPROM is programmed by serial input. Pin CHPTST is set to logical 1. The EEPROM data is then serially entered on pin F5IN while a shift clock (PRGCLK) is delivered at pin 12. The data is shifted on the rise of each clock pulse. The serial data bits are preceded by a logical 1 followed by the program bits PB00 through PB35. Transmitter 1 begins EEPROM programming when it detects that the leading logical 1 has reached the end of the EEPROM 17 shift register.

Figures 6, 7, 8, 9, 10:
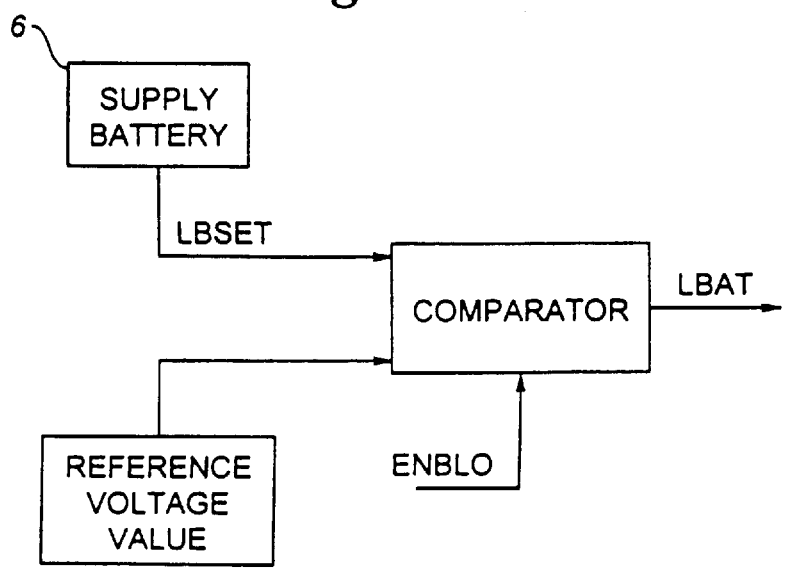
FIG. 6 is a block diagram of a main timer.
FIG. 7 is a block diagram of an interval timer.
FIG. 8 is a block diagram of a packet counter.
FIG. 9 is a block diagram of transmitter logic.
FIG. 10 is a block diagram of a battery tester.
Figure 6A:
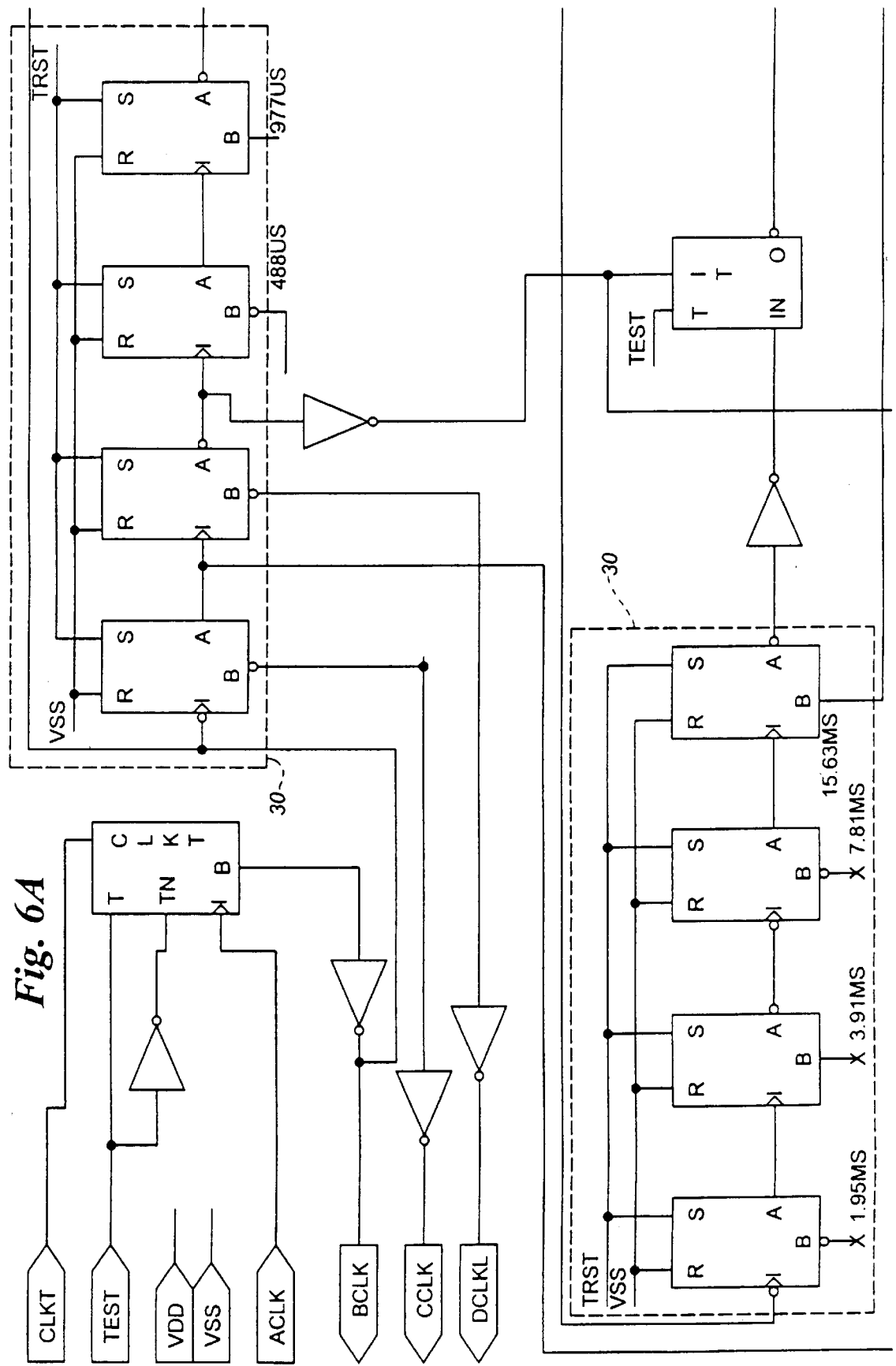
Figure 6B:
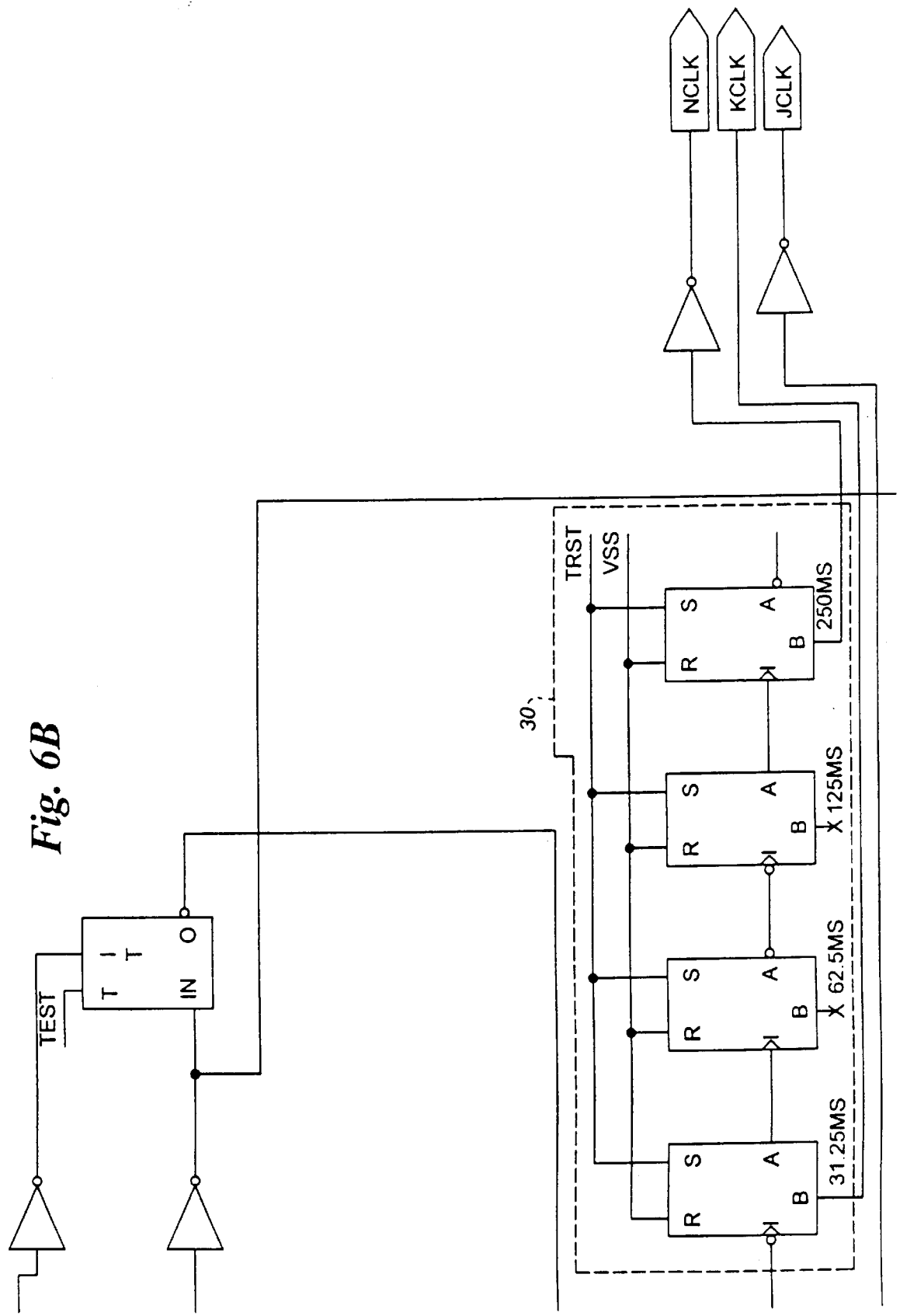
Figure 6C:
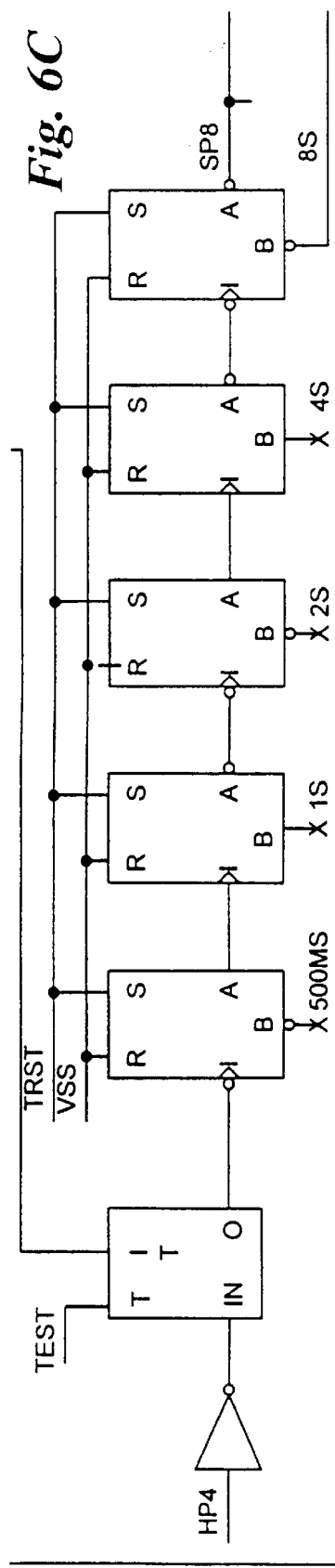
Figure 6C:
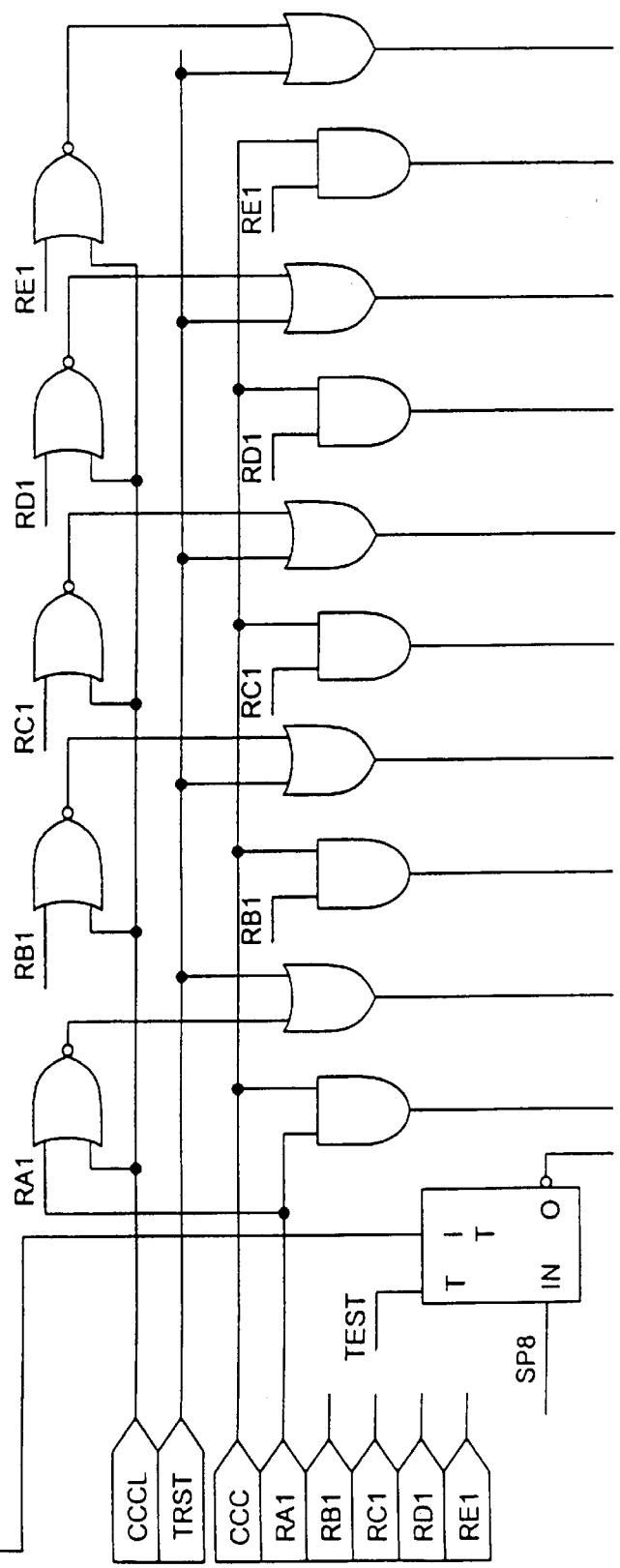
Figure 6D:
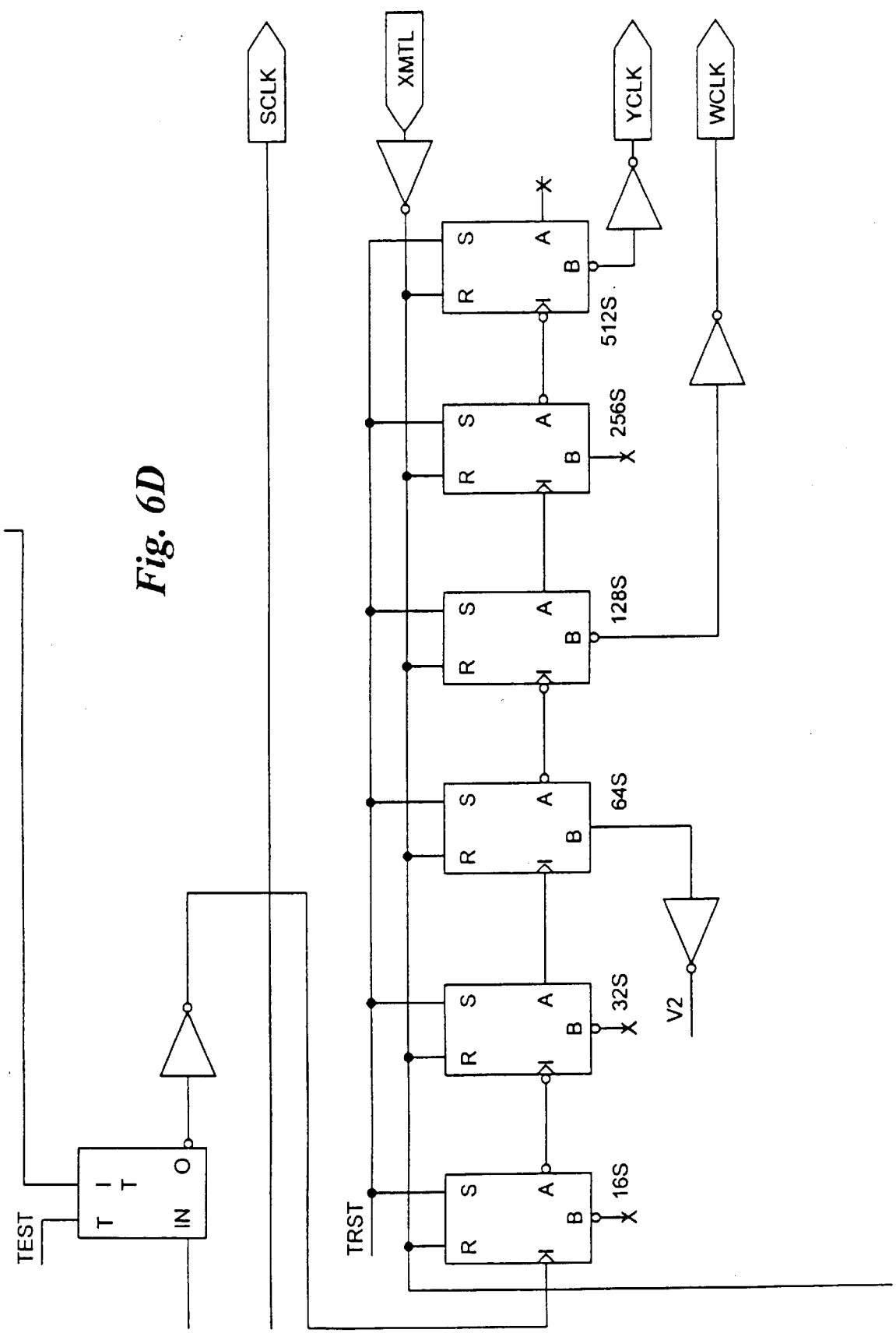
Figure 6E:
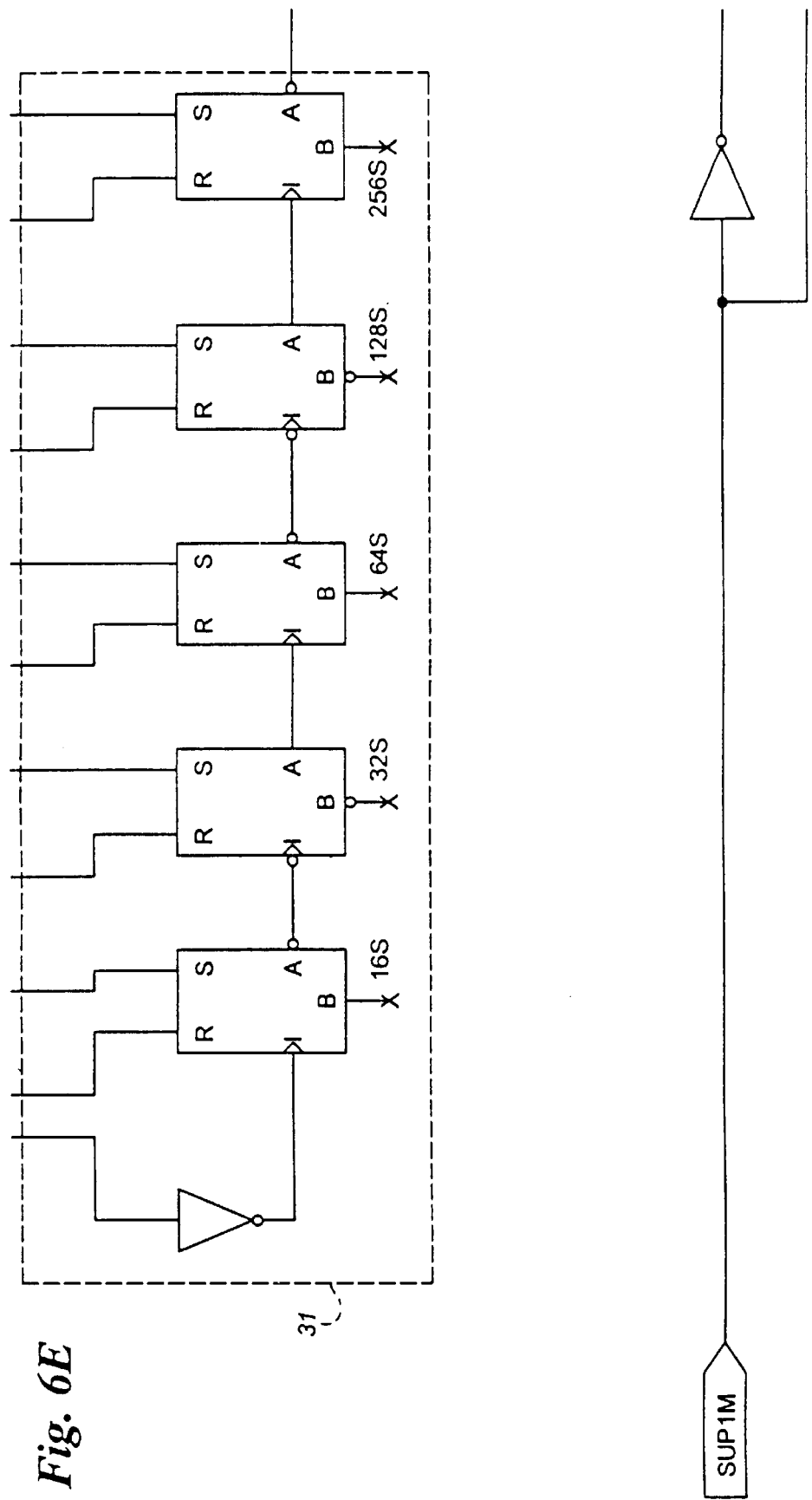
Figure 6F:
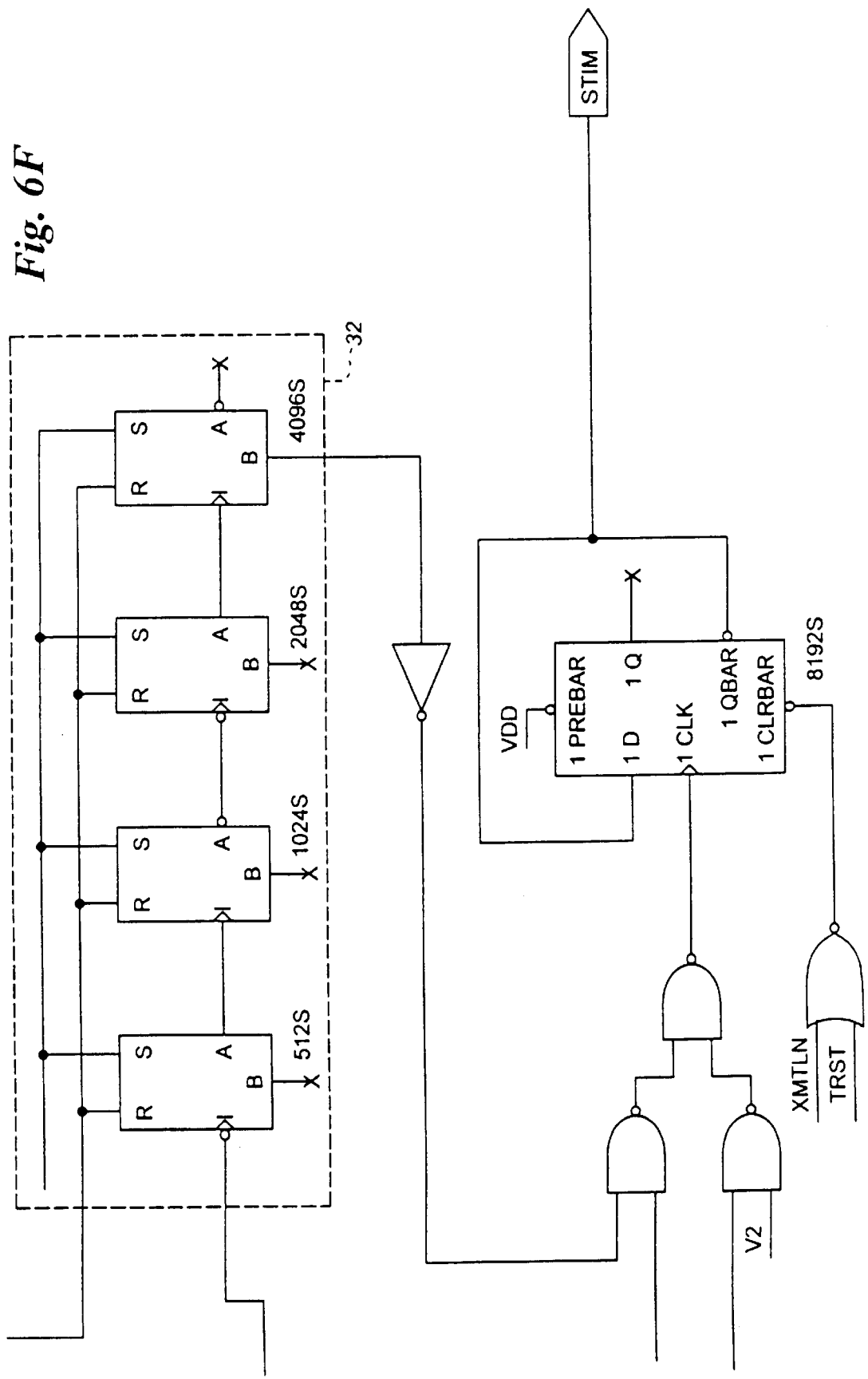
Figure 7A:
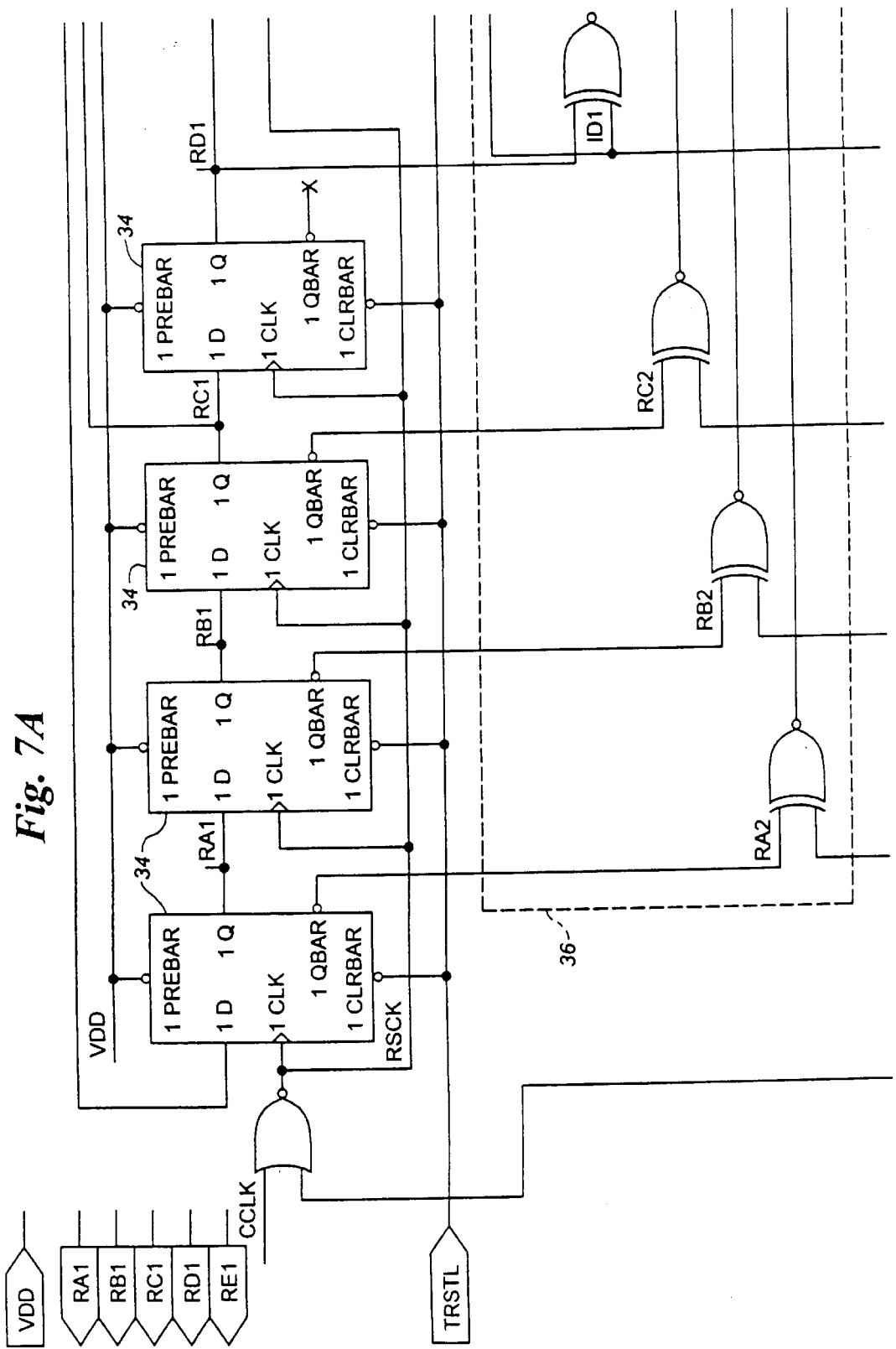
Figure 7B:
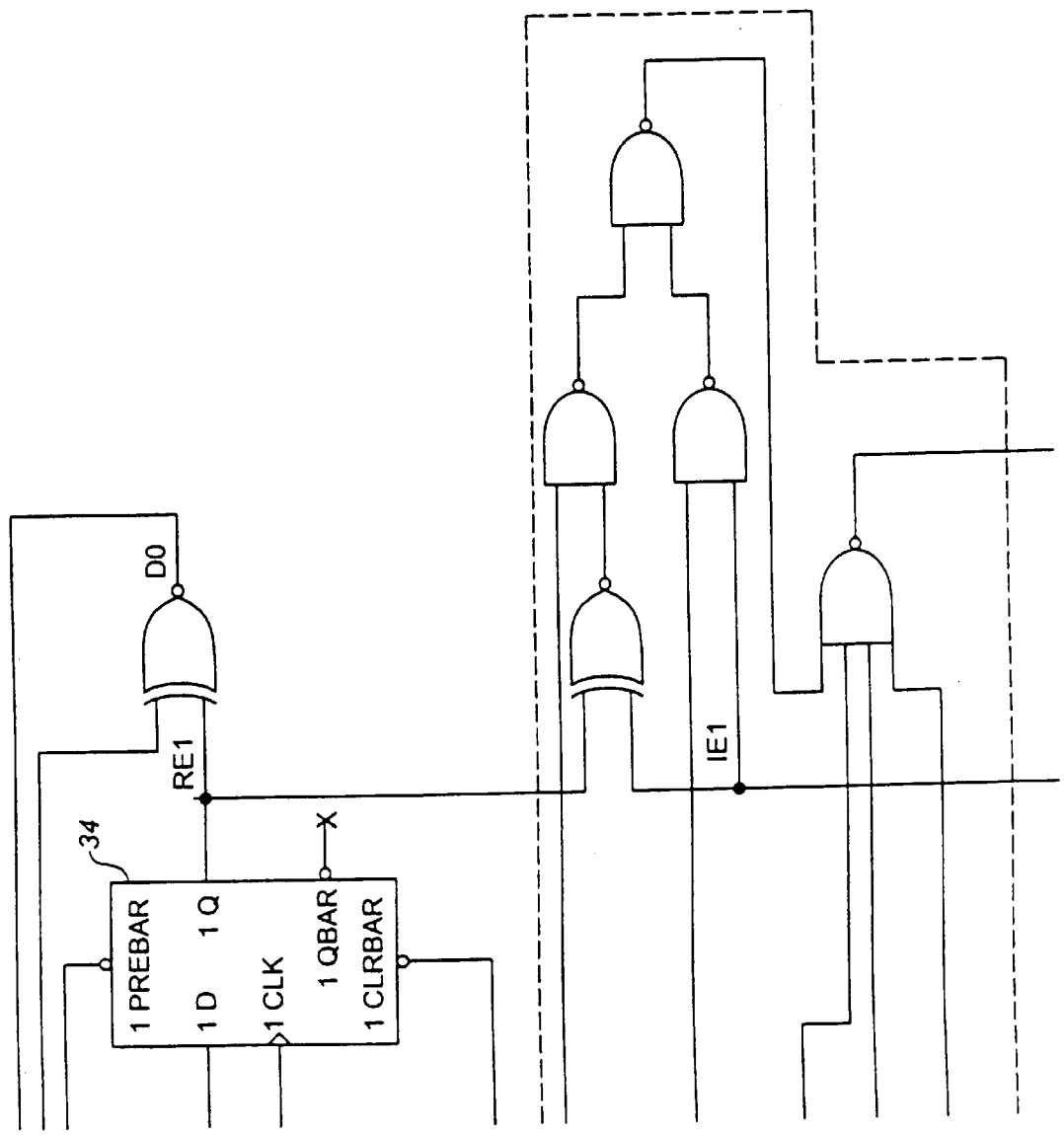
Figure 7C:
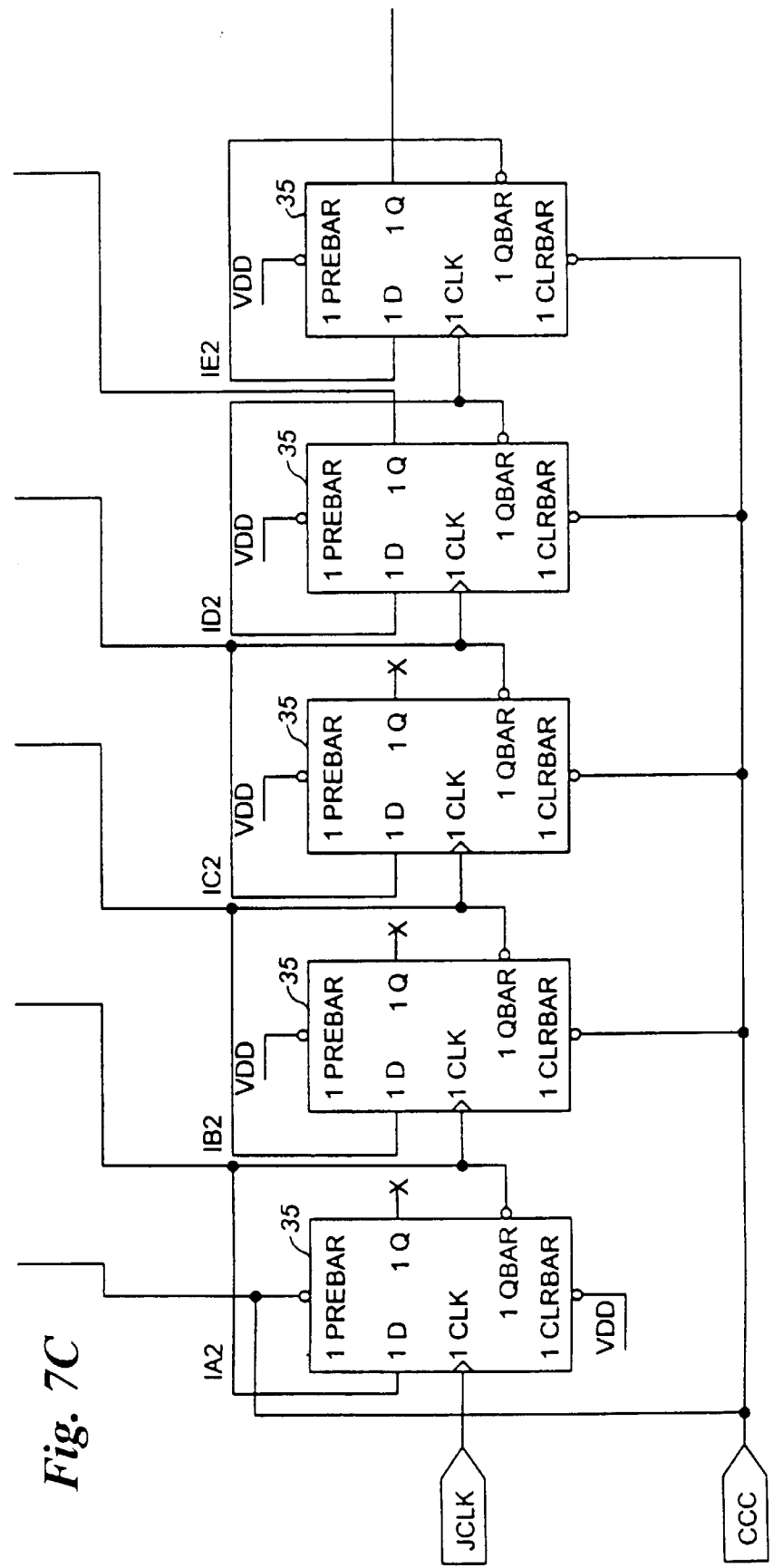
Figure 7D:
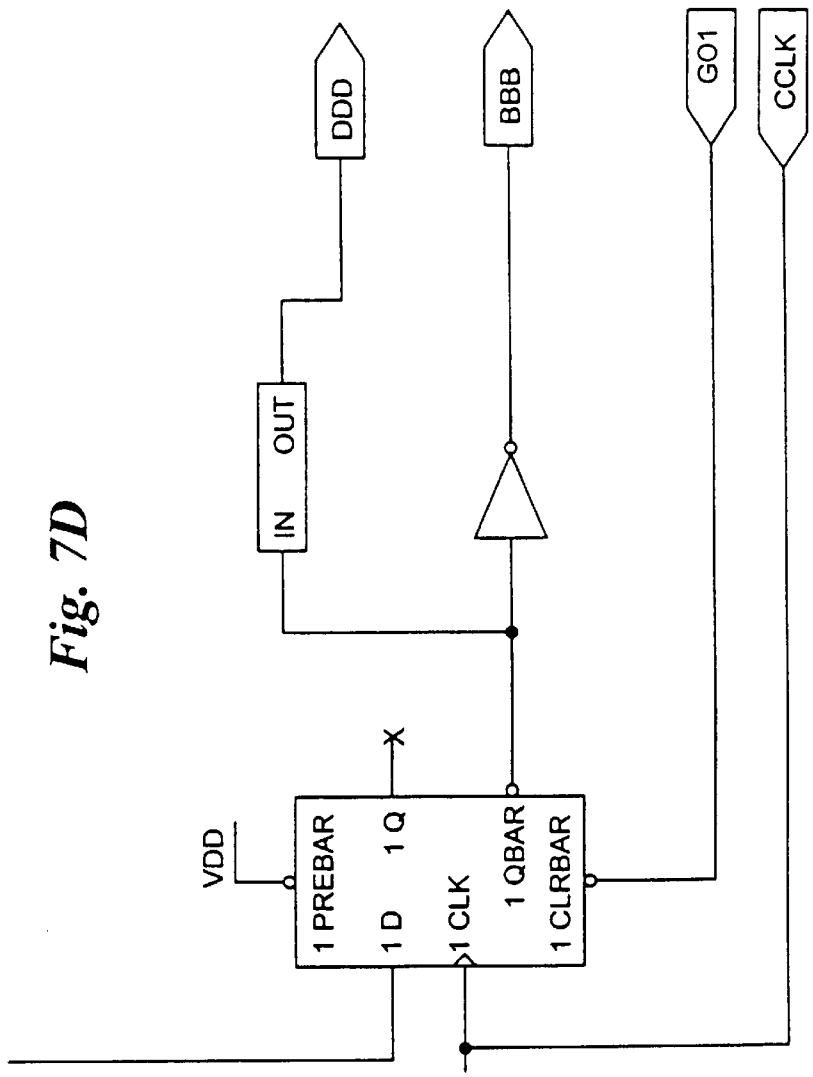
Figure 8A:
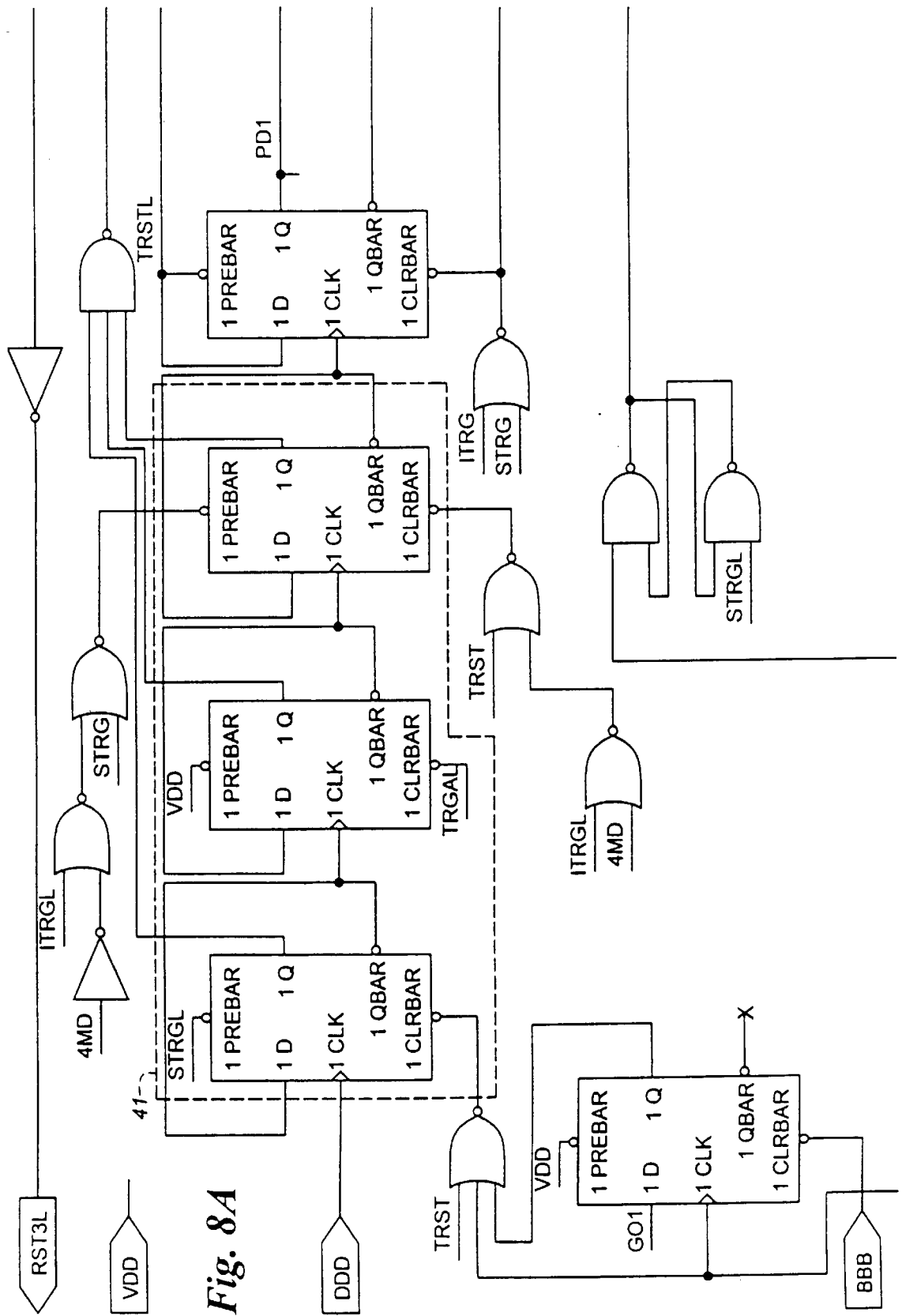
Figure 8B:
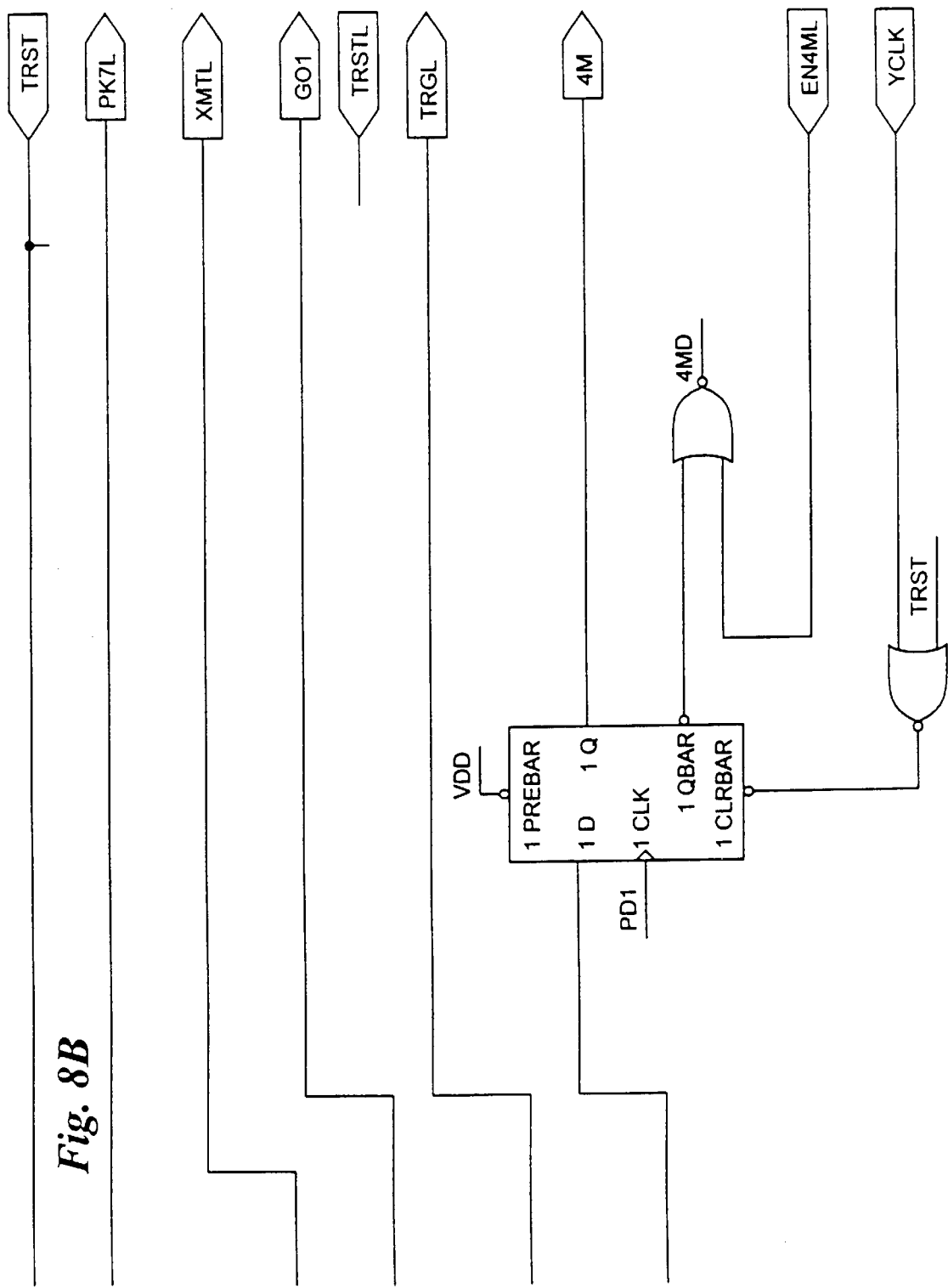
Figure 8C:
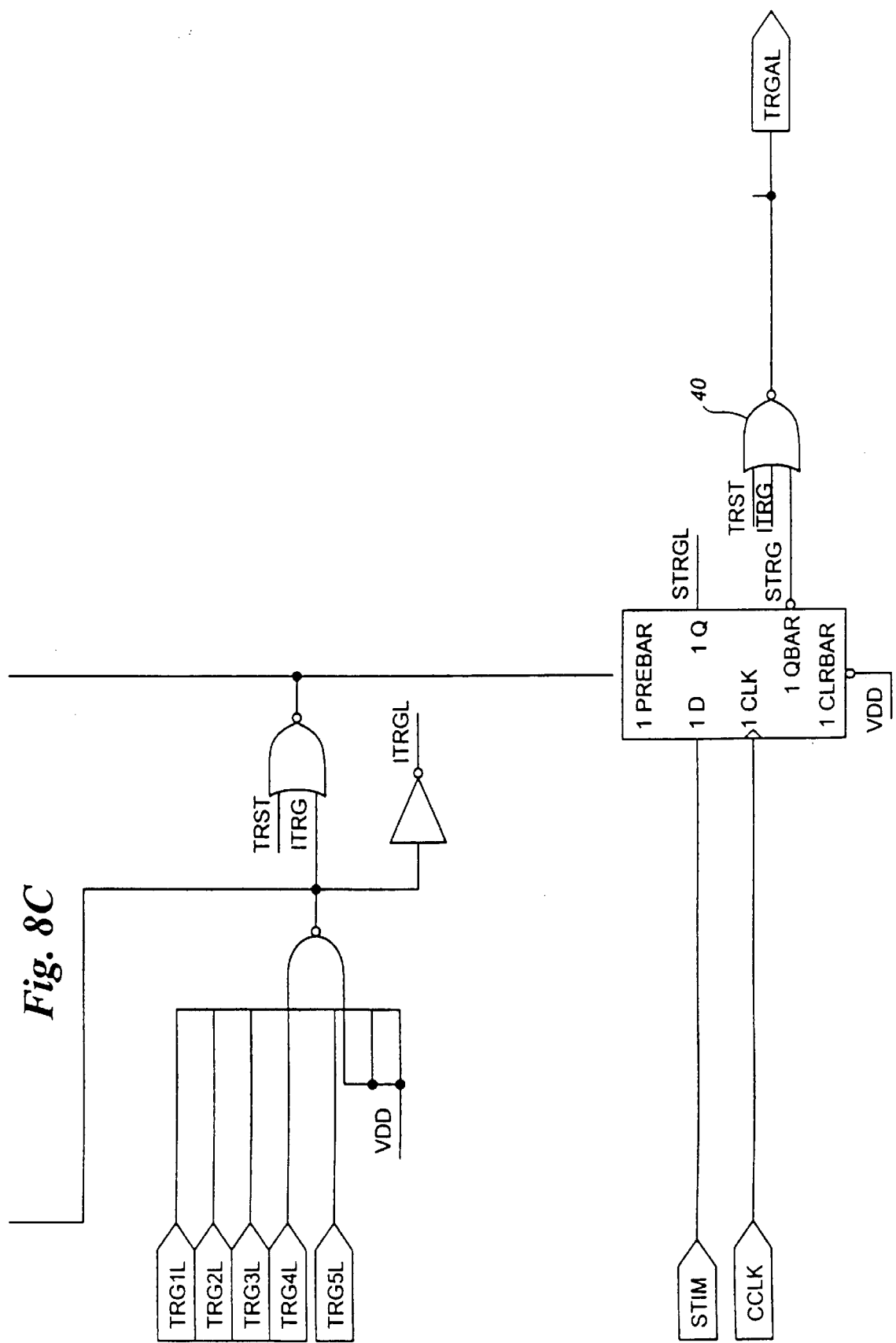
Figure 9A:
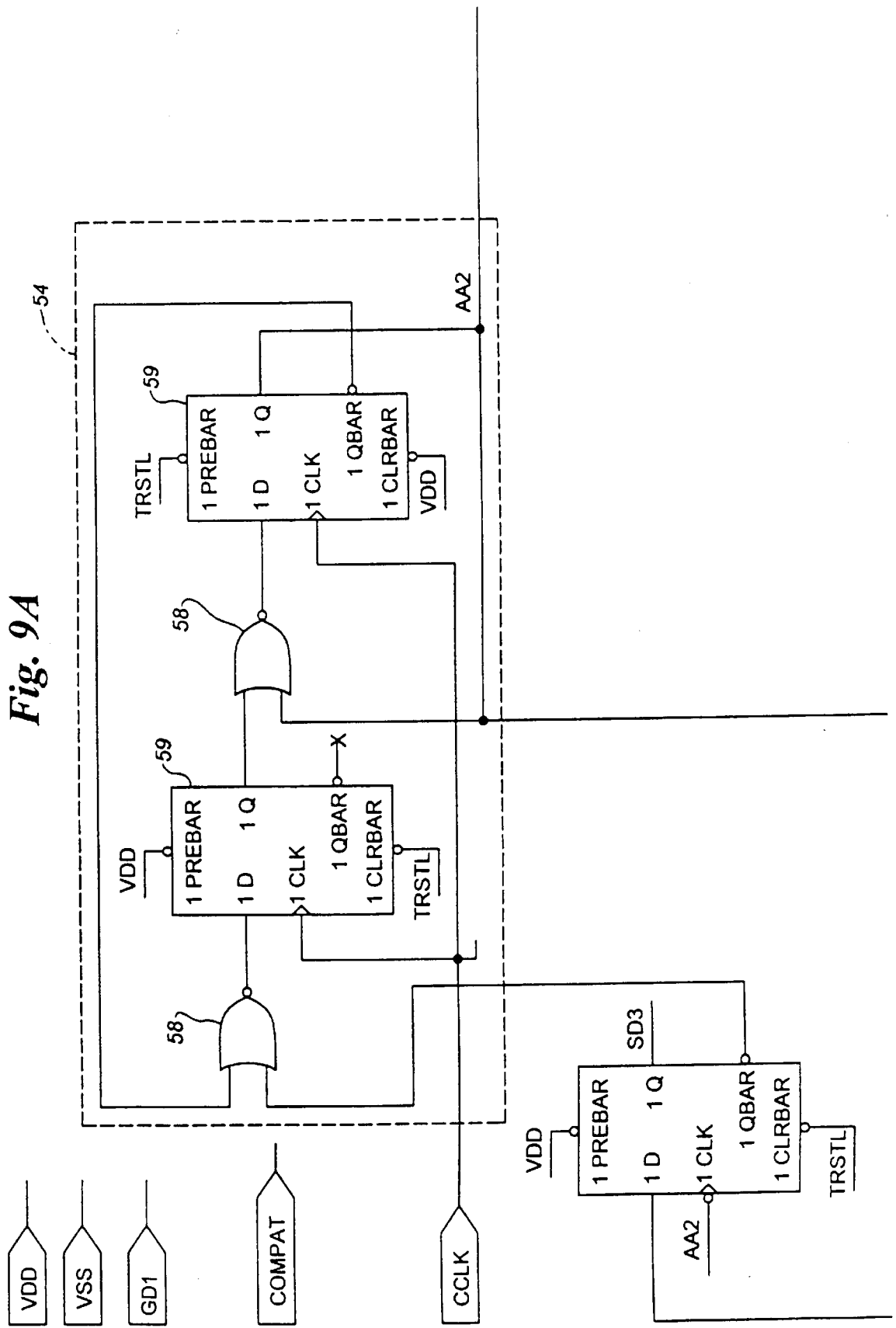
Figure 9B:
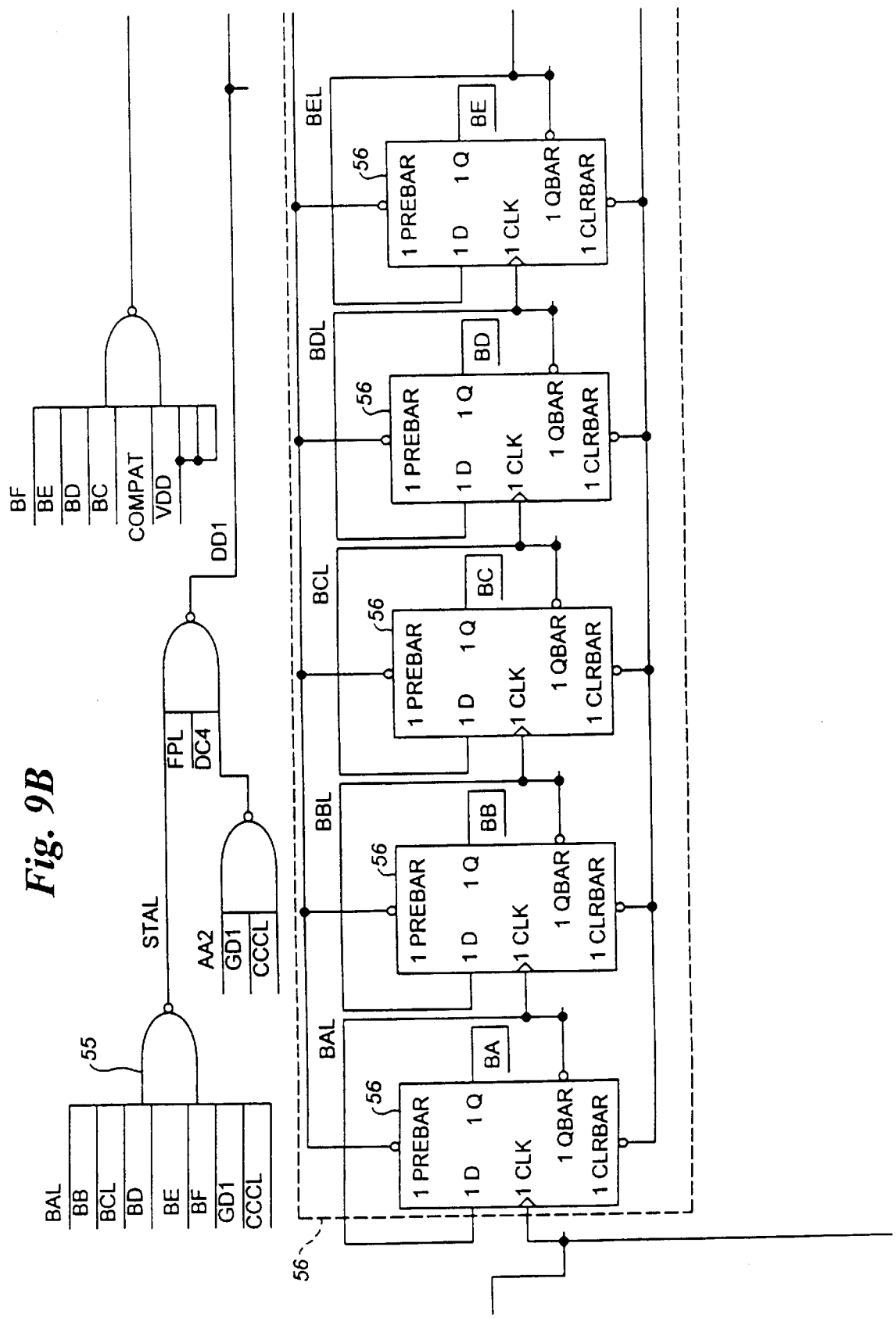
Figure 9C:
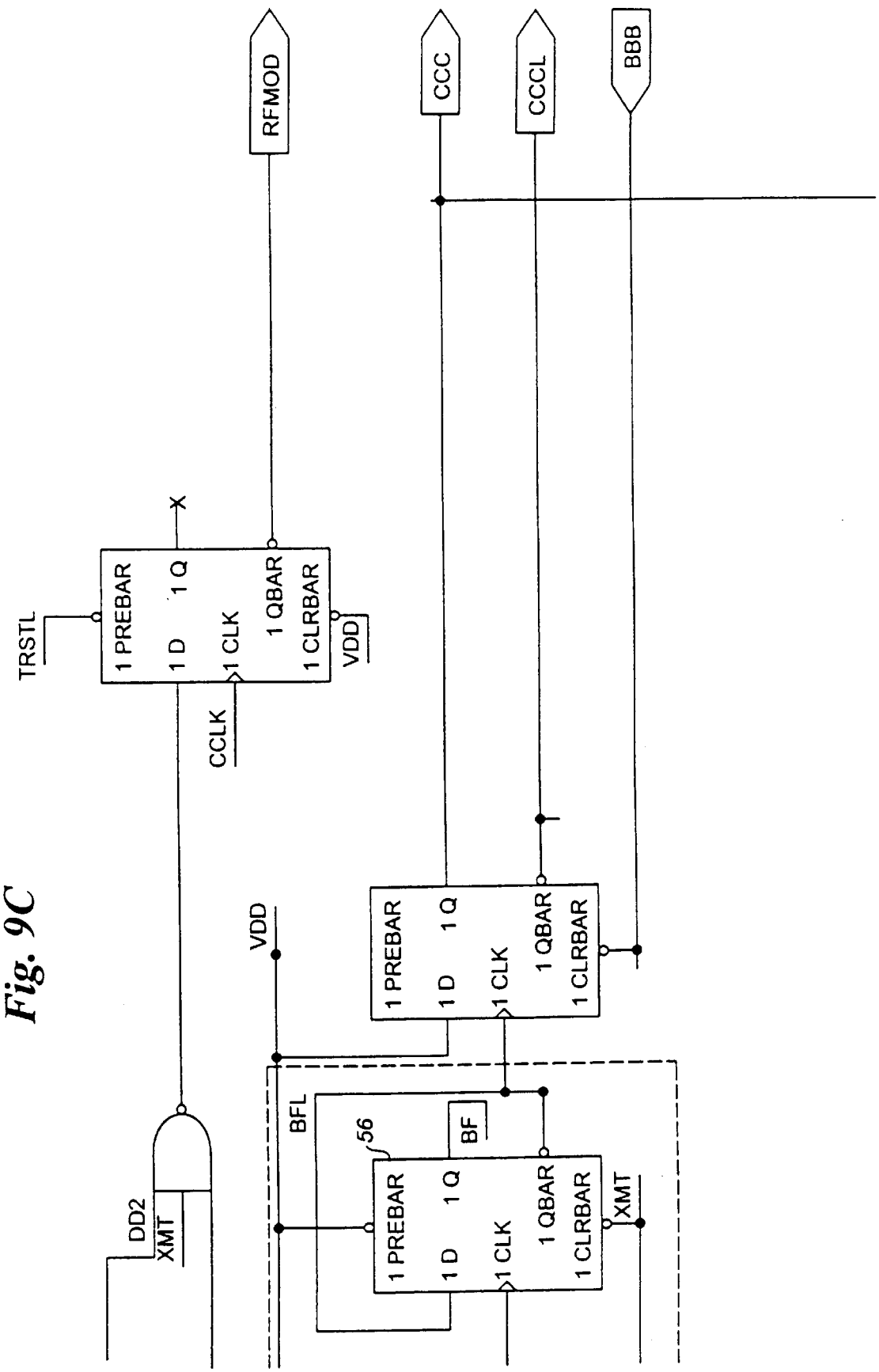
Figure 9D:
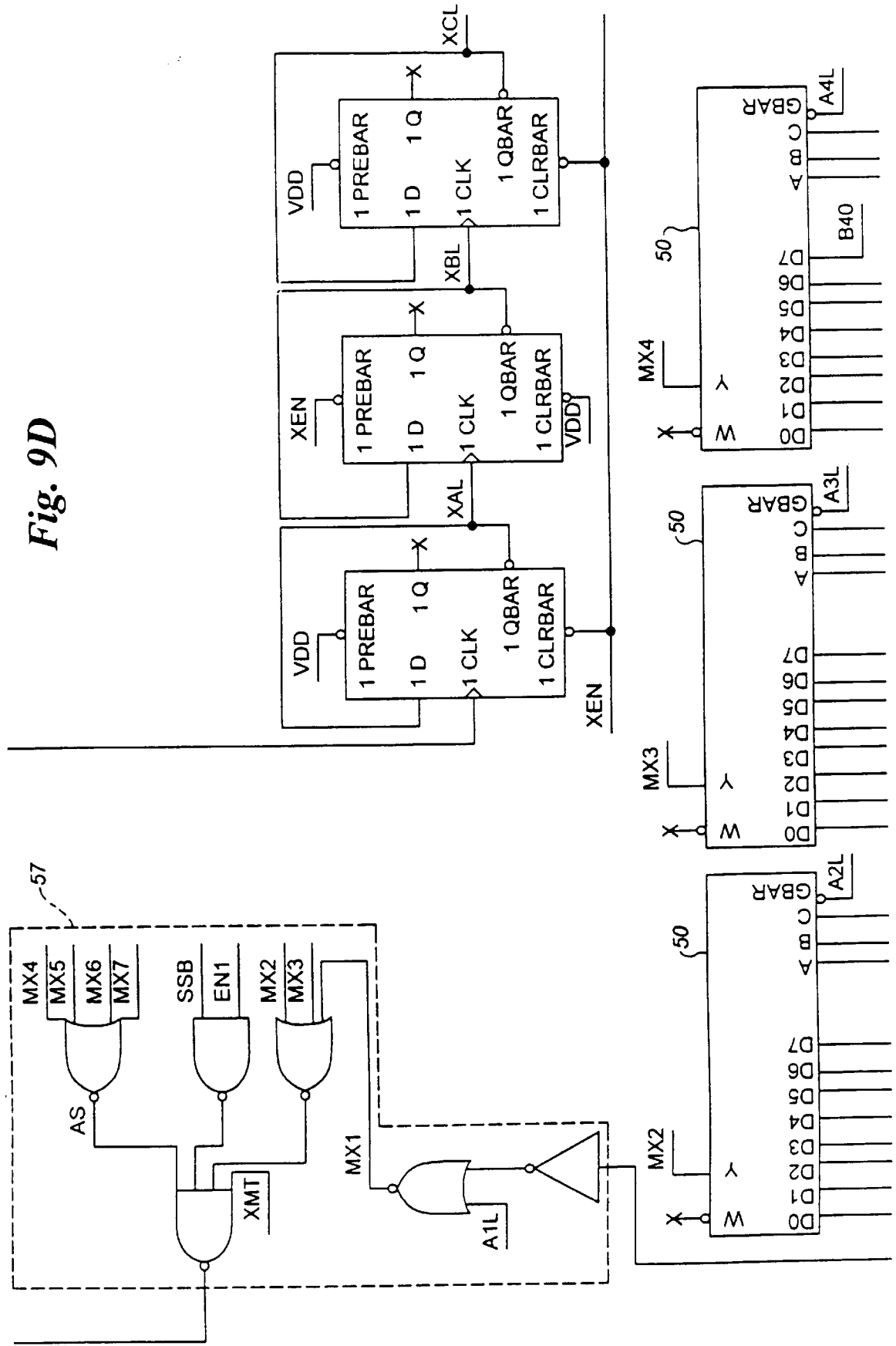
Figure 9E:
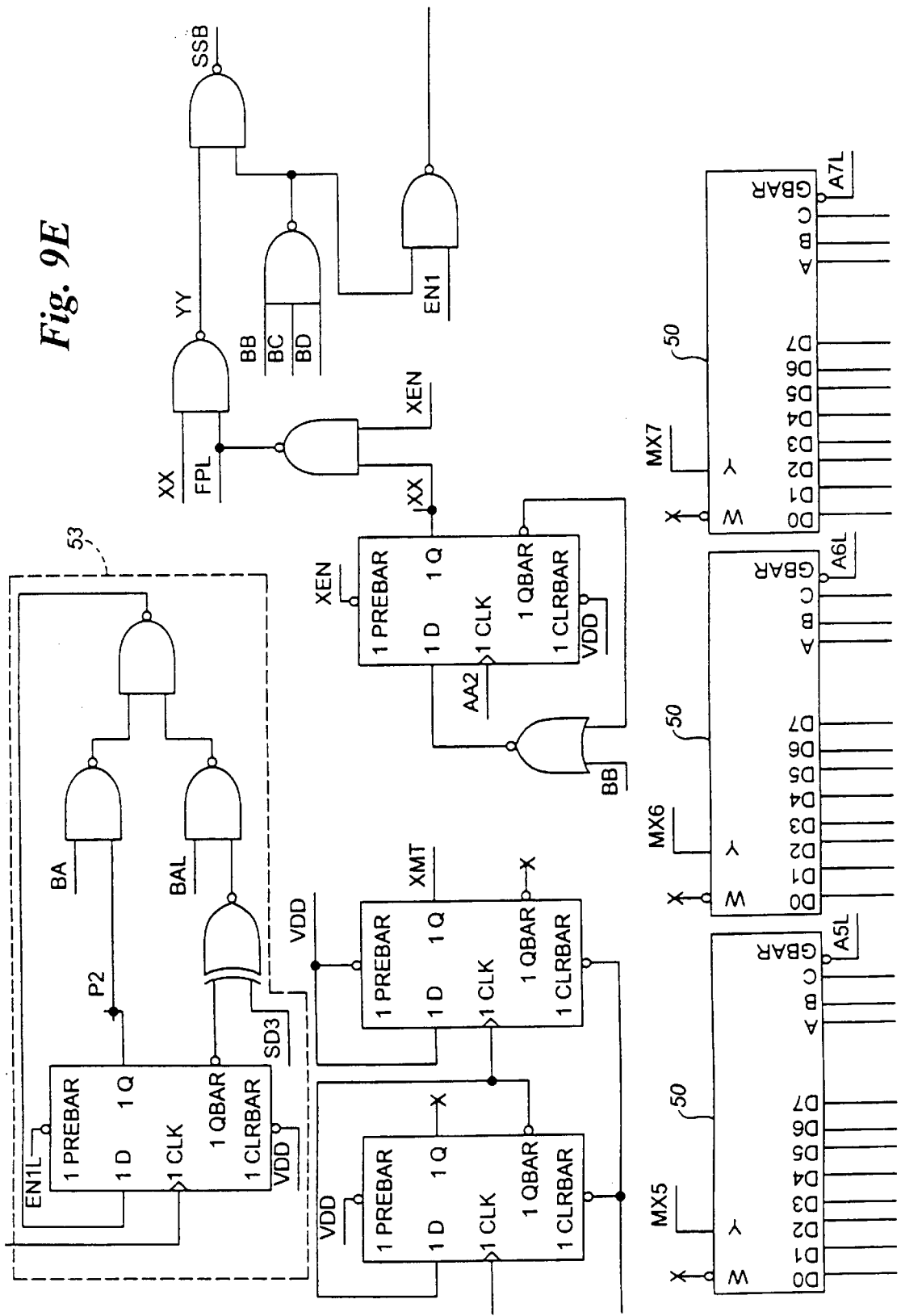
Figure 9F:
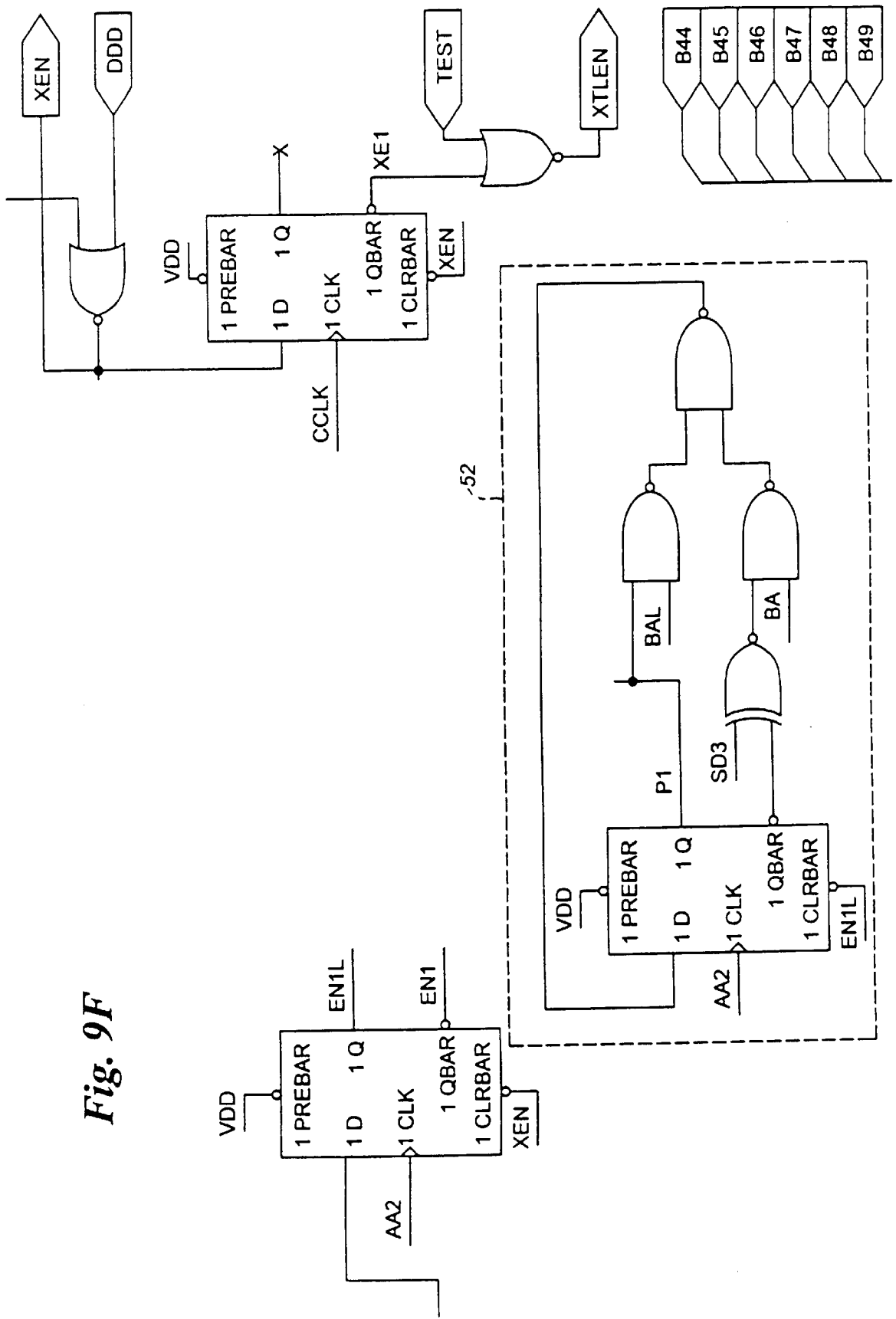
Figure 9G:
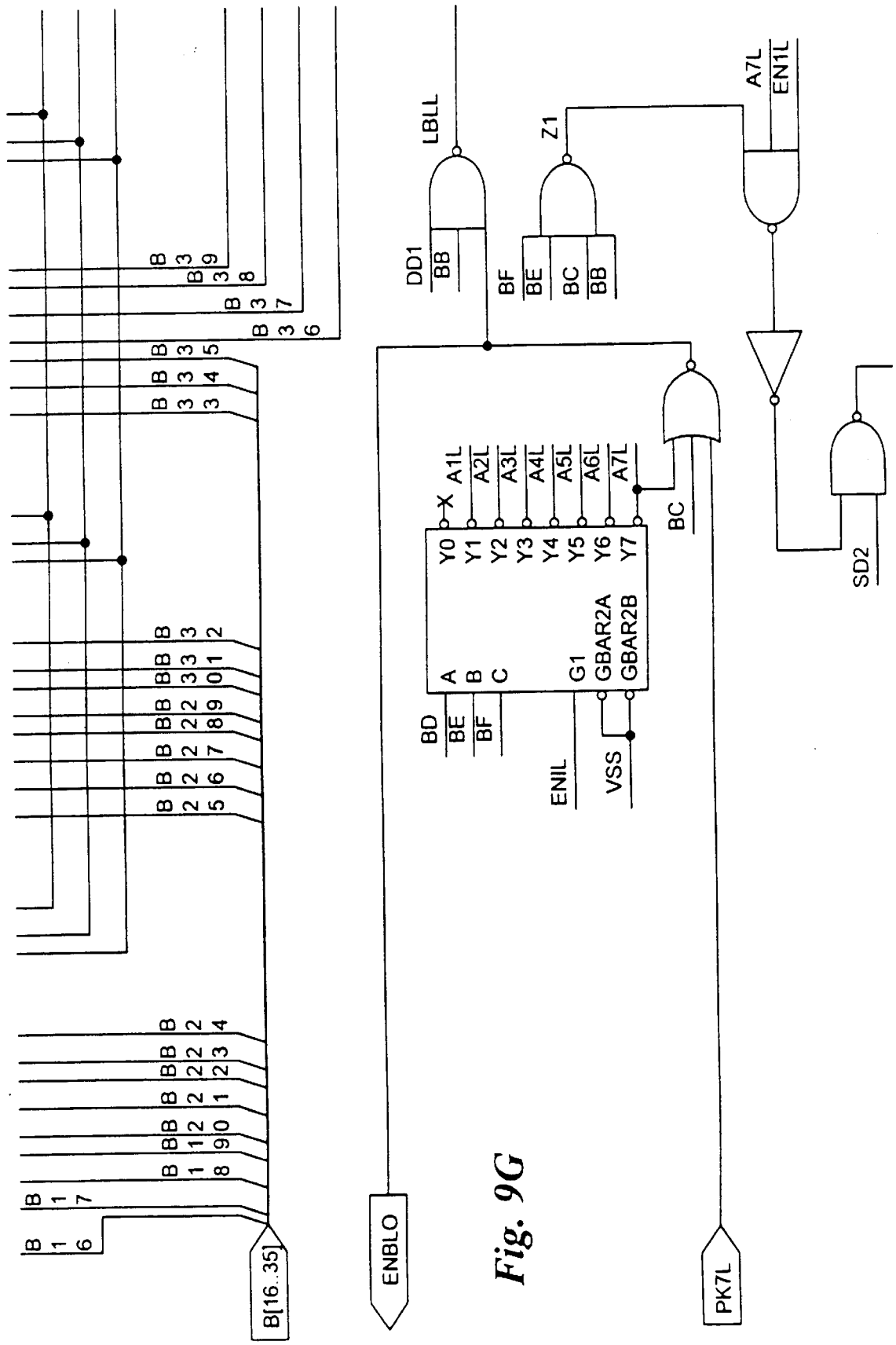
Figure 9H:
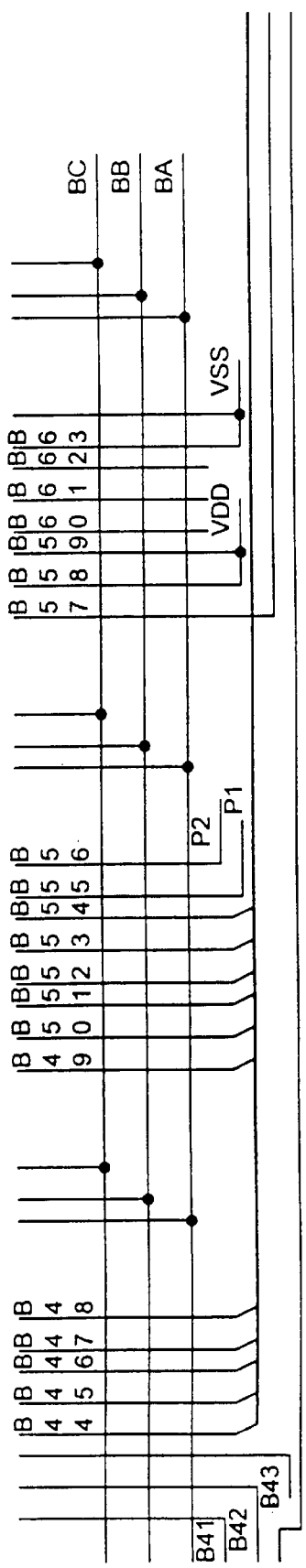
Figure 9H:
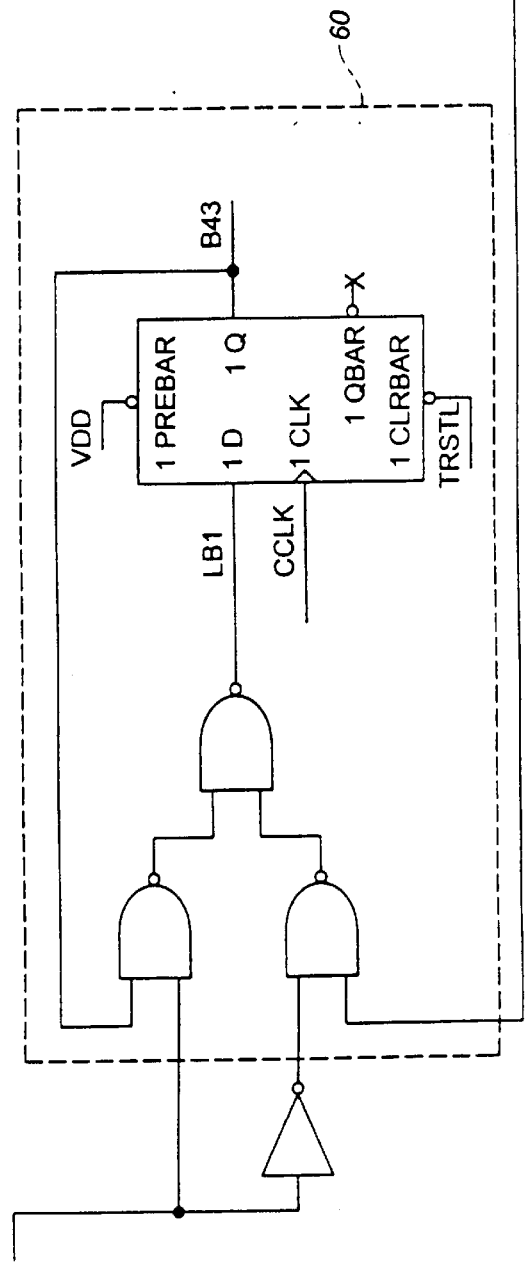
Figure 9J:
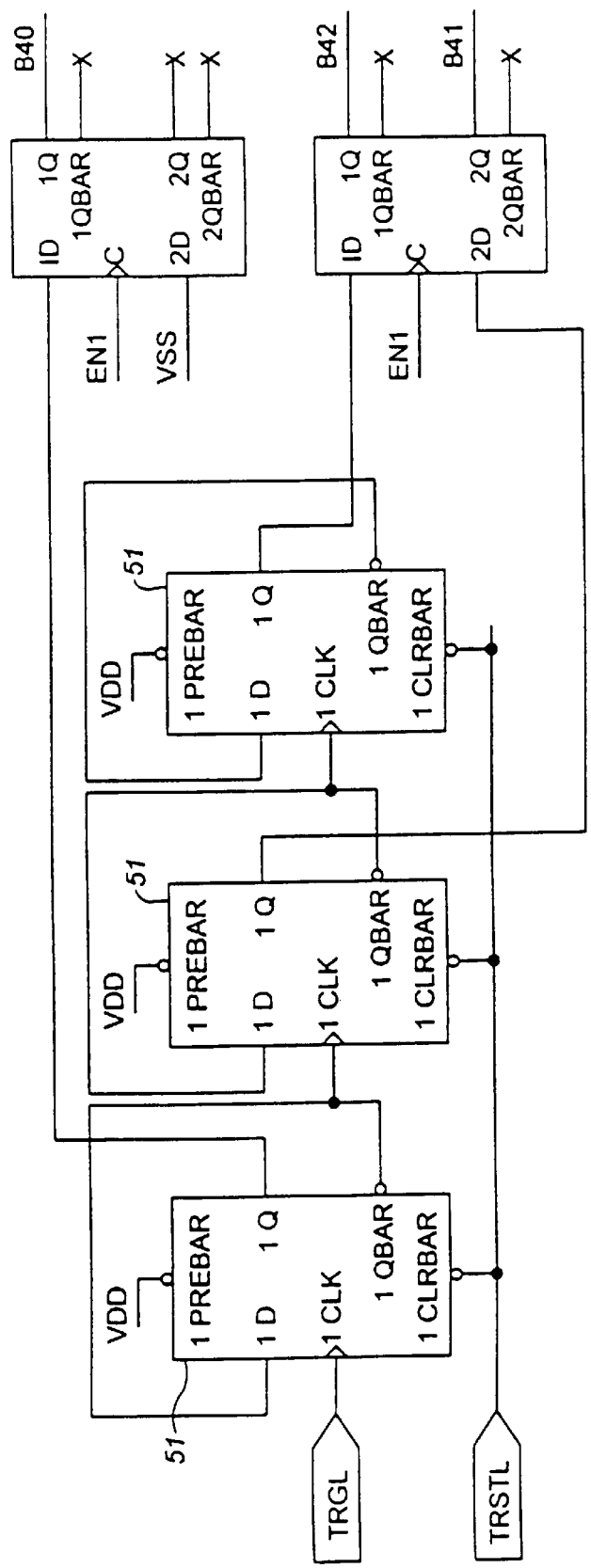
Figure 9K:
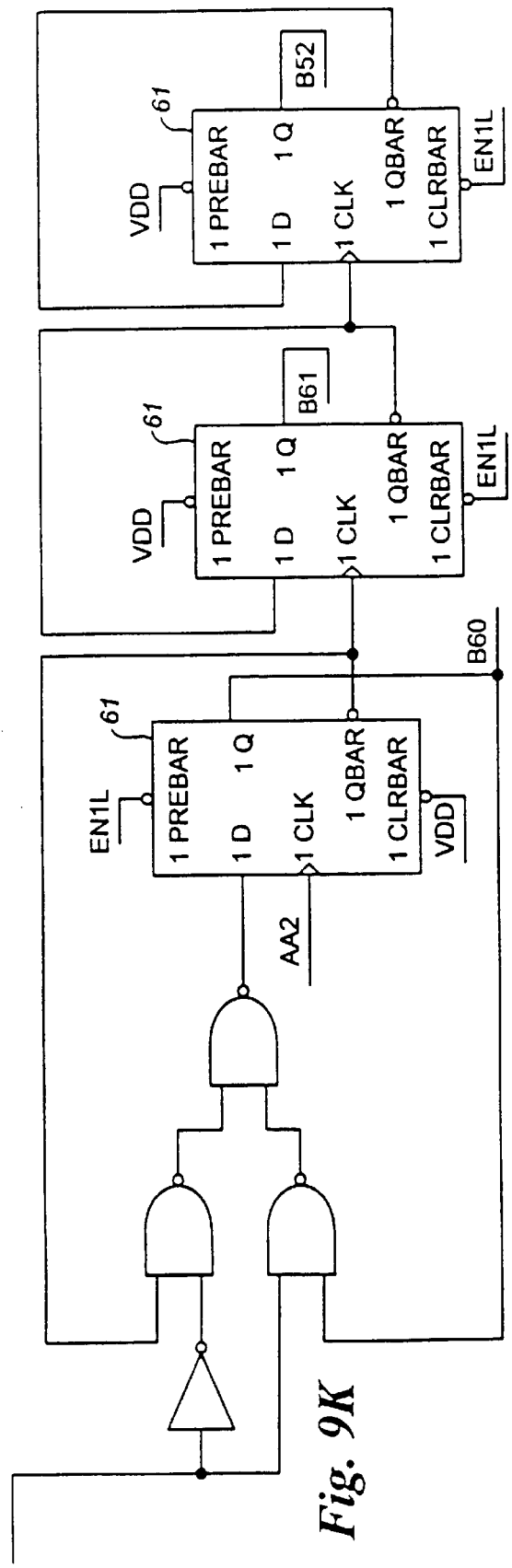

Turning to the main timer 13, as shown in FIG. 6, 32 kHz ticks are received from oscillator 134 as input ACLK. The 32 kHz signal ripples through flip-flops 30 to generate BCLK (61 µs), CCLK (122 µs), DCLK (244 µs), NCLK (250 ms), KCLK (31.25 ms), JCLK (15.63 ms), SCLK (8 seconds), YCLK (512 seconds), and WCLK (128 seconds). Other clock signals are also generated, including 62.5 ms and 125 ms.

The lower half of FIG. 6 discloses a timer used to generate the pseudo-random supervisory timing period between sixty-four (64) and sixty-eight (68) minutes from the end of the last packet transmission. The pseudo-random period is used to prevent packet collisions at the system controller. To achieve the pseudo-random interval, interval timer 14 generates a five-bit pseudo-random number on lines RA1 through RE1 (FIG. 7). This number is sent to a two hundred and fifty-six second timer, formed by flip-flops 31, generating a period from zero to two hundred and fifty-six seconds (roughly zero to four minutes). This number is then added into flip-flops 32, to generate a pseudo-random period from 64 to 68 minutes.

Input signal XMTL resets the supervisory timer after every message packet generated by transmitter 1. When input signal SUP1M, from EEPROM 17, is a logical 1, the supervisory time period is reduced to sixty-four (64) seconds (e.g., for high security applications).

Interval timer 14 generates a pseudo-random time interval (from approximately 93 to 453 ms) between packets within a group, reducing the possibility that collisions of critical packets will occur at the system controller.

As shown in FIG. 7, flip-flops 34 function as a pseudo-random sequence generator having the sequence: 15, 08, 17, 1E, 1D, 1B, 16, 0D, 1A, 14, 09, 13,06, 0C, 18, 10, 00, 01, 03, 07, 0E, 1C, 19, 12, 04, 08, 11, 02, 05, 0A 15 . . . This pseudo-random sequence generator is driven by timing signal CCLK from main timer 13.

The lower half of FIG. 7 discloses a counter formed by flip-flops 35 using JCLK from main timer 13 and signal CCC from transmitter logic 12. The counter is reset at the end of each packet transmission by signal CCC. The pseudo-random sequence generator is then stopped at a pseudo-random value. Gate array 36 allows the lower counter to count until the following equivalencies are met: IA1=RA1 and IB1=RB1 and IC1=RC1 and [(ID1=RD1 and IE1=1) or (IE1=RE1 and ID1=1)]. This yields a pseudo-random time interval between 93 and 453 ms. Interval timer 14 then generates end-of-interval pulses DDD and BBB, which are sent to packet counter 15 and transmitter logic 12.

Packet counter 15 works with transmitter logic 12 and interval timer 14 to determine the correct number of packets for transmission and then count the generated packets. As shown in FIG. 8, packet counter 15 has five types of inputs. Signals DDD and BBB are generated by interval timer 14 at the end of each pseudo-random time interval between packets. Signals TRG1L to TRG5L are inputs from each of the input processors 10. Signal STIM is from main timer 13 and generates a signal pulse when the supervisory time interval times out. Signal EN4ML is from EEPROM bit EP28 and enables the battery saving feature where new sensor inputs detected within 4.25 minutes of the end of the last packet transmission yield a message transmission of only four packets. Finally, packet counter 15 includes various clock inputs, including signals CCLK and YCLK.

Flip-flops 41 are used to count the number of packets for each transmission. As discussed above, normally the transmitter generates a group of eight identical message packets for each sensor input detected. In order to save the transmitter battery, the transmitter can be programmed at EEPROM bit EP28 to generate only four message packets if a change in sensor input is detected within 4.25 minutes of the end of the last packet transmission. Finally, when the supervisory period times out, only three message packets are generated for the supervisory message.

Under normal operating conditions, any one of the TRG1L to TRG5L input signals will cause flip-flops 41 to count eight packets before generating signal PK7L (discussed further below). If EEPROM bit EP28 is set to a logic 1, then the four packet feature is enabled. Therefore, if a sensor input is generated by one of TRG1L to TRG5L within 4.25 minutes of the end of the last packet transmission, flip-flops 41 will generate the signal PK7L after four packets are counted.

If there are no changes in inputs detected within the supervisory time interval, signal STIM causes flip-flops 41 to count three packets before generating signal PK7L.

Signal PK7L is sent to transmitter logic 12 and is used to latch the low battery signal (LBAT) on the stop bit of the last packet for that transmission. As discussed above, the last packet may be either the eighth, fourth, or third packet.

Packet counter 14 also generates the output signal 4M, which is used to control switching of the strong or weak pull-up resistors as discussed above regarding FIG. 4A. Signal TRGAL is sent to the EEPROM circuitry to load the EEPROM data into associated EEPROM latches. This configuration helps ensure that the correct EEPROM data is used for each set of message packets. The TRGAL signal is generated on each sensor input that generates a TRG1L to TRG5L signal, or the supervisory times out and generates the STIM signal.

The XMTL signal is sent to main timer 13 and is used to reset the flip-flops used to count the supervisory time interval. Therefore, the supervisory time interval is always counted from the last packet transmission, whether that packet transmission is based on a detected change in sensor inputs or a previous supervisory message. Signal XMTL is also sent to each of the input processors 10 and resets the latched input signal, FXLTCH, at the end of each transmission.

Signal TRGL is sent to transmit logic 12 and used to generate a three-bit trigger count.

Transmitter logic 12 is connected to the other major components of transmitter 1 to generate the message packets. As shown in FIG. 9, multiplexers 50 have as inputs the data for each packet, i.e., bits 16–63, including the device ID code (bits 16–35), device type code (bits 36–39), a "trigger" count (bits 40–42) which counts the number of times the transmitter has been triggered (either sensor or supervisory), low battery (bit 43), debounced and latched input signal FXDB and FXLTCH for each input 5 (bits 44–54), even and odd parity (bits 55 and 56), program bit (bit 57), old stop bit (bit 58), logical 1 (bit 59), modulus eight count of logical 1's in bits 15–64 (bit 60–62), and logical 0 (bit 63).

The device ID code and device type code are available from EEPROM 17. The trigger count is a three-bit value generated by flip-flops 51 using signals TRGL and TRSTL from packet counter 15. Low battery signal LBAT is received from battery tester 16 (FIG. 10). The input and latch values are received from input processors 10 for inputs 5 on lines B44 to B54.

Even and odd parity bits are output from even and odd parity generators 52 and 53, respectively. Even parity generator 52 uses the output of modulation signal generator 54 to count the odd bits (only bits 15–63) and to generate a parity bit P1 so that the sum of the odd bits and the parity bit is even. P1 is input into a multiplexer 50 and added to each message packet at bit 55.

Odd parity generator 53 also uses the output of modulation signal generator 54 to count the value of the even bits (only 16–64) and generate a parity bit P2 so that the sum of the even bits and the parity bit is odd. P2 is input into a multiplexer 50 and added to each message packet as bit 56.

The old stop bit is generated at gate 55 as 366 $\mu$s off and allows the transmitter to be used with older system controllers that recognize only 58-bit message packets. Bit 59 is used as a dummy bit to clear the old stop bit, bit 58, and allow bits 60–63 to be properly processed.

Bits 60 to 62 can be used to provide error detection information that is processed by the system controller. For example, flip-flops 61 can be used to count the number of "ones" in bits 15 through 54. This count can then be processed by the system controller to determine if there are errors in the message packet.

Flip-flops 56 form a counter that counts the 64 bits of each message packet. Output signal CCC is sent to interval timer 14 to start the packet interval time delay.

Multiplexers 50 and associated gates 57, serially input data bits 15–63 into modulation signal generator 54. Modulation signal generator 54 converts the internal binary code, recognized as voltage on (1) or off (0), into the modulated binary code described above (1=122 $\mu$s RF on and 244 $\mu$s RF off, 0=122 $\mu$s RF on and 122 $\mu$s RF off). This modulation scheme is achieved by a divide-by-2 or -3 counter formed by gates 58 and flip-flops 59.

Battery tester 16 generates an output signal LBAT. When LBAT is logical 1 the battery is low and needs to be replaced or recharged. A good time to measure the battery is at the end of the transmission of a group of packets. In the block diagram of battery tester 16, shown in FIG. 10, the supply voltage is compared to a reference voltage. If the battery voltage drops too low, transmitter 1 may not function correctly and RF modulation circuit 3 may not generate a strong enough signal for the system controller to receive and decode the message packets. Therefore, each message packet includes information, at bit 43, on the status of the supply battery. When bit 43 is 0, the battery voltage is above the reference voltage, and when bit 43 is 1, the battery voltage is below the reference voltage. When the supply battery voltage is below the reference voltage, this information at bit 43 can be used by the system controller or monitoring station to warn the user that the battery must be checked.

The supply battery should be tested at a period of its lowest charge to ensure that a low battery signal is sent early enough to prevent failure of the system. The end of the transmission of the last packet was selected. Other timing points may be selected based on the desired sensitivity of the battery test function.

As discussed above, packet counter 15 generates signal PK7L at the end of transmission of the last packet. PK7L is used by transmit logic 12 to generate ENBLO. The ENBLO signal enables battery tester 16 to compare the battery voltage to the reference voltage and generate LBAT.

The LBAT signal is input into latch circuit 60 in transmitter logic 12. PK7L is also used to generate LBLL which goes low on the stop bit (bit 63) of the last packet. Latch circuit 60 then latches the LBAT signal for use in the next set of message packets.

The latched LBAT signal is not used in the last packet of the current packet transmission. If the battery is low, then the last packet may not be received or properly decoded by the system controller. The latched LBAT signal is used at bit 43 in each packet of the next group of packets transmitted (due to sensor activation or supervisory interval), increasing the probability that at least one message packet containing the low battery information will be received and properly decoded by the system controller.

Focusing now on message packet management, transmitter 1 may dynamically vary the number of redundant message packets that are transmitted to the system controller in response to a sensor trigger. As indicated above, when EEPROM bit EP28 is a logical 1, the message packet management feature is activated as shown in packet counter 15 in FIG. 8. When the message packet management feature is enabled, signal 4MD causes flip-flops 41 to count only four packets and causes signal PK7L to be generated on the fourth packet. Therefore, for the first 4.25 minutes after the end of the last packet transmission, only four message packets are generated for that sensor trigger.

After 4.25 minutes, signal 4MD goes low, allowing flip-flops 41 to again count to eight after the next sensor trigger.

When EEPROM bit EP28 is a logical 0, the message packet management system is deactivated and flip-flops 41 will always count eight packets for each sensor trigger, generating PK7L on the eighth packet.

Other embodiments are within the scope of the following claims.

What is claimed is:

1. A method of sending information in the form of redundant message packets between a remote device and a host device, said method comprising:
   determining a frequency of trigger events in the remote device; and
   regulating a rate of redundant message packets based on the determined frequency.

2. A method according to claim 1, wherein said regulating comprises selecting a quantity of redundant message packets that are sent for a given one of the trigger events based on the determined frequency.

3. A method according to claim 1, wherein said regulating comprises reducing a quantity of redundant message packets if the determined frequency of trigger events exceeds a threshold value.

4. A method according to claim 3, wherein the threshold value is about 4.25 minutes.

5. A method according to claim 1, wherein said regulating comprises increasing a quantity of redundant message packets if the determined frequency of trigger events is less than a threshold value.

6. A method according to claim 5, wherein the threshold value is about 4.25 minutes.

7. A method according to claim 1, further comprising transmitting a predetermined quantity of message packets from the remote device to the host device for each trigger event.

8. A method according to claim 1, wherein said regulating comprises transmitting N redundant message packets from the remote device to the host device if the frequency of trigger events is less than a threshold value, and transmitting M redundant message packets from the remote device to the host device if the frequency of trigger events is greater than or equal to the threshold value, where M is not equal to N.

9. A method according to claim 8, wherein N is about 8 and M is about 4.

10. A method according to claim 1, wherein said determining and said regulating are performed by the remote device.

11. A method according to claim 1, wherein said determining comprises measuring a time interval between sending a prior message packet and a next trigger event in the remote device.

12. A method according to claim 1, wherein the message packets comprise trigger event data, and the remote device and the host device comprise parts of a security system.

13. An apparatus for managing the transmission of message packets from a remote device to a host device, said apparatus comprising:
    a first component for measuring a frequency of successive input signals received from an external source; and
    a second component, connected to said first component, for varying a quantity of message packets sent from the remote device to the host device based on the frequency measured by said first component.

14. An apparatus according to claim 13, wherein said first and second components are in the remote device.

15. An apparatus according to claim 13, further comprising a depletable power source.

16. An apparatus according to claim 13, wherein said second component reduces the quantity of redundant message packets sent if the measured frequency exceeds a threshold value.

17. An apparatus according to claim 16, wherein the threshold value is about 4.25 minutes.

18. An apparatus according to claim 13, wherein said second component increases the quantity of redundant message packets sent if the measured frequency is less than a threshold value.

19. An apparatus according to claim 18, wherein the threshold value is about 4.25 minutes.

20. An apparatus according to claim 13, wherein said first component measures the frequency by calculating a time interval between the successive input signals.

21. An apparatus according to claim 13, further comprising a transmitter for transmitting N redundant message packets from the remote device to the host device if the measured frequency of input signals is less than a threshold value, and for transmitting M redundant message packets from the remote device to the host device if the measured frequency of input signals is greater than or equal to the threshold value, where M is not equal to N.

22. An apparatus according to claim 21, wherein N is about 8 and M is about 4.

23. A remote device for use in a security system, said remote device comprising:
    a depletable power source;
    a sensor responsive to security trigger events;
    a transmitter connected to send redundant trigger event data packets to a host device in response to the security trigger events; and
    a regulator connected to control the transmitter to vary a rate at which the redundant trigger event data packets are sent based on a rate at which security trigger events occur.

24. A method for transmitting messages from a remote sensing device to a system controller in a security system, the method comprising the steps of:

sending a series of redundant messages from the remote sensing device to the system controller in response to a trigger event sensed by the remote sensing device;

determining a frequency of occurrence of the sensed trigger event; and selecting a quantity of the redundant messages sent by the remote sensing device to the system controller based on the determined frequency.

25. A security sensing device comprising:

a sensor for sensing a trigger event indicative of a security condition;

a transmitter for transmitting a series of redundant messages in response to the trigger event;

a controller for controlling the number of redundant messages transmitted by the transmitter based on a frequency of occurrence of the sensed trigger event.

* * * * *